US010701429B2

(12) United States Patent
Tulabandhula et al.

(10) Patent No.: US 10,701,429 B2
(45) Date of Patent: Jun. 30, 2020

(54) METHOD AND SYSTEM FOR DISPLAYING TARGETED MULTIMEDIA ITEMS TO A RIDESHARING GROUP

(71) Applicant: Conduent Business Services, LLC, Dallas, TX (US)

(72) Inventors: Theja Tulabandhula, Bangalore (IN); Arun Rajkumar, Chennai (IN); Asmita Metrewar, Nanded (IN); Koyel Mukherjee, Bangalore (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 0 days.

(21) Appl. No.: 15/238,012

(22) Filed: Aug. 16, 2016

(65) Prior Publication Data

US 2018/0054647 A1 Feb. 22, 2018

(51) Int. Cl.
*H04N 21/414* (2011.01)
*H04N 21/239* (2011.01)
(Continued)

(52) U.S. Cl.
CPC ... *H04N 21/41422* (2013.01); *H04N 21/2393* (2013.01); *H04N 21/25883* (2013.01); *H04N 21/25891* (2013.01); *H04N 21/812* (2013.01)

(58) Field of Classification Search
None
See application file for complete search history.

(56) References Cited

U.S. PATENT DOCUMENTS 8,655,891 B2   2/2014   Ramer et al.
8,660,539 B2   2/2014   Khambete et al.
(Continued)

FOREIGN PATENT DOCUMENTS

WO   WO 2014123505 A1   8/2014

OTHER PUBLICATIONS

U.S. Appl. No. 15/225,074, filed Aug. 1, 2016; Methods and Systems for Automatically Creating and Suggesting Compatible Ride-Sharing Groups; Koyel Mukherjee et al.
(Continued)

*Primary Examiner* — Nathan J Flynn
*Assistant Examiner* — Christen A Kurien
(74) *Attorney, Agent, or Firm* — Jones Robb, PLLC

(57) ABSTRACT

The disclosed embodiments illustrate method for displaying targeted multimedia items to a ridesharing group. The method includes transmitting a plurality of multimedia items to a computing device installed in a vehicle. The method further includes receiving at least one feedback provided by a plurality of users on each of the transmitted plurality of multimedia items. The method includes determining an effectiveness score for each of the transmitted plurality of multimedia items based on the corresponding at least one feedback provided by the plurality of users. The method includes selecting a plurality of targeted multimedia items from the plurality of multimedia items in real-time based on the determined effectiveness score and a pre-specified constraint. The method includes transmitting the selected plurality of targeted multimedia items in a prioritized order to the computing device. The transmitted plurality of targeted multimedia items is displayed to the plurality of users traveling in the vehicle.

20 Claims, 8 Drawing Sheets

(51) Int. Cl.
*H04N 21/81* (2011.01)
*H04N 21/258* (2011.01)

(56) References Cited

U.S. PATENT DOCUMENTS

| | | | |
|---|---|---|---|
| 8,763,033 B2 | 6/2014 | Dittus | |
| 8,825,526 B2 | 9/2014 | Peters et al. | |
| 2006/0282856 A1* | 12/2006 | Errico | G06F 17/30035 725/46 |
| 2013/0297608 A1* | 11/2013 | Etoh | G06F 17/30035 707/737 |
| 2014/0278910 A1* | 9/2014 | Visintainer | G06Q 30/0242 705/14.41 |
| 2015/0019469 A1 | 1/2015 | Ioannidis et al. | |
| 2015/0095271 A1 | 4/2015 | Ioannidis et al. | |
| 2015/0142555 A1* | 5/2015 | Zheng | G06Q 30/0241 705/14.43 |
| 2016/0066004 A1* | 3/2016 | Lieu | H04N 21/2541 725/29 |

OTHER PUBLICATIONS

Miroslav Dudik, Daniel Hsu, Satyen Kale, Nikos Karampatziakis, John Langford, Lev Reyzin, and Tong Zhang. E_cient optimal learning for contextual bandits. In Proceedings of the 27th Conference on Uncertainty in Arti_cial Intelligence, 2011.

Jon Feldman, Monika Henzinger, Nitish Korula, Vahab S Mirrokni, and Cli_ Stein. Online stochastic packing applied to display ad allocation. In Algorithms{ESA 2010, pp. 182{194. Springer, 2010.

Alekh Agarwal, Daniel Hsu, Satyen Kale, John Langford, Lihong Li, and Robert E. Schapire. Taming the monster: A fast and simple algorithm for contextual bandits. In The 31st International Conference on Machine Learning (ICML), 2014.

Peter Auer, Nicolo Cesa-Bianchi, Yoav Freund, and Robert E Schapire. The nonstochastic multiarmed bandit problem. vol. 32, pp. 48{77. SIAM, 2002.

Alina Beygelzimer and John Langford. The o_set tree for learning with partial labels. In Proceedings of the 15th ACM SIGKDD International Conference on Knowledge Discovery and Data Mining, pp. 129{138. ACM, 2009.

* cited by examiner

METHOD AND SYSTEM FOR DISPLAYING TARGETED MULTIMEDIA ITEMS TO A RIDESHARING GROUP

TECHNICAL FIELD

The presently disclosed embodiments are related, in general, to data processing. More particularly, the presently disclosed embodiments are related to methods and systems for displaying targeted multimedia items to a ridesharing group.

BACKGROUND

Recent developments in the field of transportation services have led to the evolution of online platforms that may cater to various on-demand traveling requirements of commuters. Specifically, in case of private transportation services, such as taxi services, ridesharing has emerged as a popular solution around the world to combat rising fuel prices and ever-increasing traffic congestion along road networks. Currently, vehicles providing such private transportation services often have in-vehicle display screens that may be used to monetize by displaying multimedia items as promotional activities for various products and/or services. This may be quite lucrative as commuters, in ridesharing groups, spend a substantial time traveling in the vehicles.

In certain scenarios, such multimedia items displayed on in-vehicle display screens may be customized, based on one or more preferences and/or feedback of a commuter to ensure higher effectiveness. However, in case of multiple commuters in a ridesharing group, customization of such in-vehicle displayed multimedia items may become challenging. This may be due to the reason that often people behave differently in a group than as an individual, and certain actions (that may be the desired outcome of a displayed multimedia item) are more likely to be taken in a collaborative manner rather than individually. Thus, due to the inter-personal equations and influences, group behavioral dynamics are often different from individual ones. For example, a commuter may not prefer viewing a multimedia item while traveling alone, however in a ridesharing group, the same commuter may have to opt for viewing the same multimedia item while traveling. The aforementioned challenges may make the customization of the in-vehicle displayed multimedia items a non-trivial task for most techniques known in the art. Therefore, an automatic and robust technique is required for real-time customization of the in-vehicle displayed multimedia items based on group preferences and/or group feedback.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method displaying targeted multimedia items to a ridesharing group. The method includes transmitting, by one or more transceivers in a first computing device, a plurality of multimedia items to a second computing device installed in a vehicle, wherein at least a transmitted multimedia item of the plurality of multimedia items is associated with a unique product and/or service code, wherein the transmitted plurality of multimedia items are displayed by the second computing device to a plurality of users traveling in the vehicle. The method further includes receiving, by the one or more transceivers in the first computing device, at least one feedback provided by the plurality of users on each of the transmitted plurality of multimedia items, wherein the at least one feedback corresponds to a utilization of the unique product and/or service code, and/or a combined assessment provided by the plurality of users in real-time for each of the plurality of multimedia items. The method further includes determining, by one or more processors in the first computing device, an effectiveness score for each of the transmitted plurality of multimedia items based on the corresponding at least one feedback provided by the plurality of users. The method further includes selecting, by the one or more processors in the first computing device, a plurality of targeted multimedia items from the plurality of multimedia items in real-time based on the determined effectiveness score and a pre-specified constraint. The method further includes transmitting, by the one or more transceivers in the first computing device, the selected plurality of targeted multimedia items in a prioritized order to the second computing device, wherein the transmitted plurality of targeted multimedia items is displayed by the second computing device to the plurality of users traveling in the vehicle.

According to embodiments illustrated herein, there is provided a system for displaying targeted multimedia items to a ridesharing group. The system includes one or more processors in a first computing device configured to transmit a plurality of multimedia items, by utilizing one or more transceivers in the first computing device, to a second computing device installed in a vehicle, wherein at least a transmitted multimedia item of the plurality of multimedia items is associated with a unique product and/or service code, wherein the transmitted plurality of multimedia items are displayed by the second computing device to a plurality of users traveling in the vehicle. The one or more processors are further configured to receive at least one feedback, by utilizing the one or more transceivers in the first computing device, provided by the plurality of users for each of the transmitted plurality of multimedia items, wherein the at least one feedback corresponds to a utilization of the unique product and/or service code, and/or a combined assessment provided by the plurality of users in real-time for each of the plurality of multimedia items. The one or more processors are further configured to determine an effectiveness score for each of the transmitted plurality of multimedia items based on the corresponding at least one feedback provided by the plurality of users. The one or more processors are further configured to select a plurality of targeted multimedia items from the plurality of multimedia items in real-time based on the determined effectiveness score and a pre-specified constraint. The one or more processors are further configured to transmit the selected plurality of targeted multimedia items in a prioritized order, by utilizing the one or more transceivers in the first computing device, to the second computing device, wherein the transmitted plurality of targeted multimedia items is displayed by the second computing device to the plurality of users traveling in the vehicle.

According to embodiments illustrated herein, there is provided a computer program product for use with a computing device. The computer program product comprises a non-transitory computer readable medium storing a computer program code for displaying targeted multimedia items to a ridesharing group. The computer program code is executable by one or more processors in a first computing device to transmit a plurality of multimedia items, by utilizing one or more transceivers in the first computing device, to a second computing device installed in a vehicle, wherein at least a transmitted multimedia item of the plurality of multimedia items is associated with a unique product and/or service code, wherein the transmitted plurality of multimedia items are displayed by the second computing device to a plurality of users traveling in the vehicle. The computer program code is further executable by the one or more processors to receive at least one feedback, by utilizing the one or more transceivers in the first computing device, provided by the plurality of users for each of the transmitted plurality of multimedia items, wherein the at least one feedback corresponds to a utilization of the unique product and/or service code, and/or a combined assessment provided by the plurality of users in real-time for each of the plurality of multimedia items. The computer program code is further executable by the one or more processors to determine an effectiveness score for each of the transmitted plurality of multimedia items based on the corresponding at least one feedback provided by the plurality of users. The computer program code is further executable by the one or more processors to select a plurality of targeted multimedia items from the plurality of multimedia items in real-time based on the determined effectiveness score and a pre-specified constraint. The computer program code is further executable by the one or more processors to transmit the selected plurality of targeted multimedia items in a prioritized order, by utilizing the one or more transceivers in the first computing device, to the second computing device, wherein the transmitted plurality of targeted multimedia items is displayed by the second computing device to the plurality of users traveling in the vehicle.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
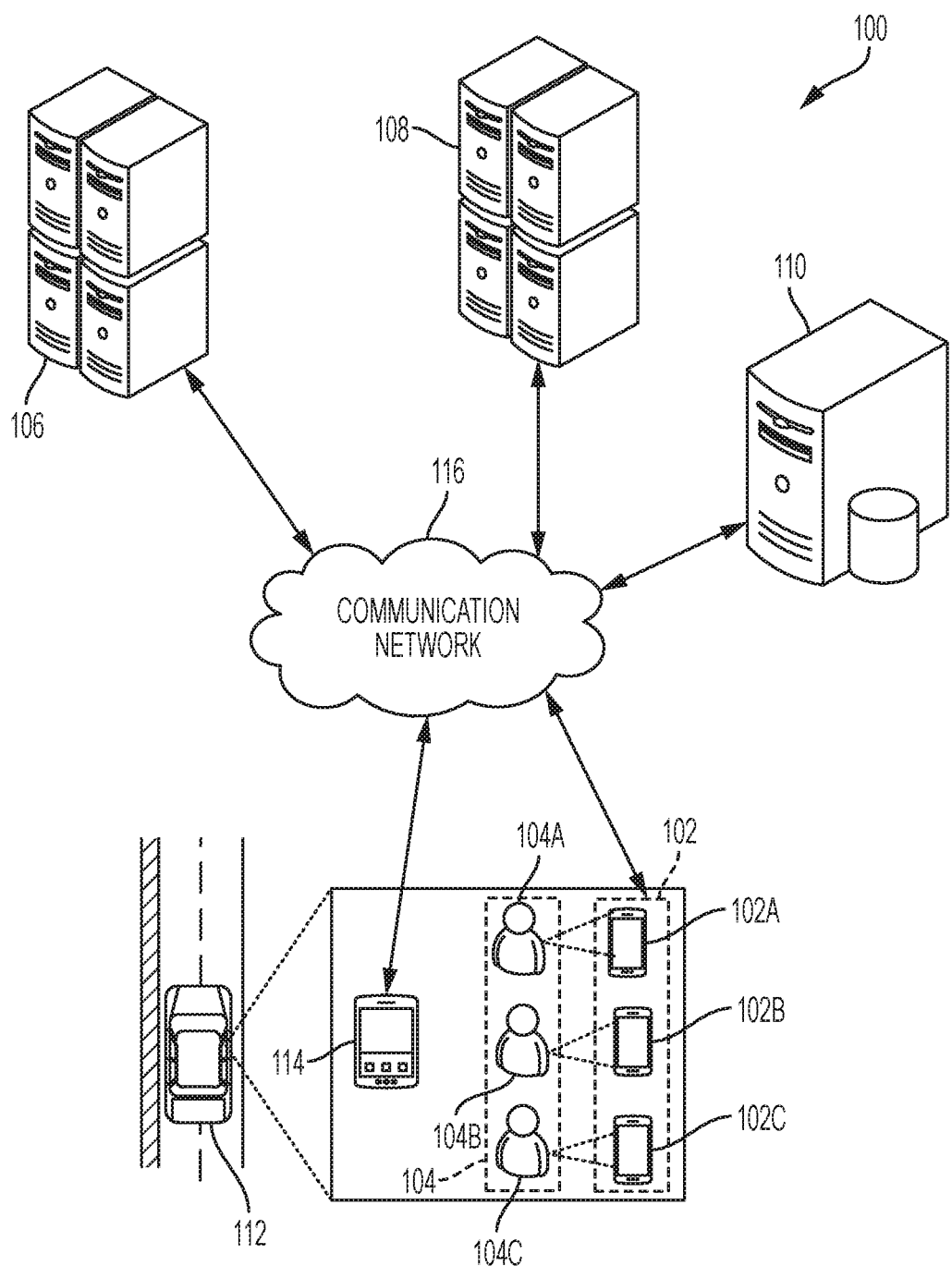
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. In an embodiment, the user-computing device may be utilized by the user to transmit a request for a transportation service (i.e., a vehicle) for commuting. In an embodiment, the user-computing device may include a navigation device with inbuilt global positioning system (GPS) sensors. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "vehicle-computing device" refers to a computer, a device (that includes one or more processors/microcontrollers and/or any other electronic components), or a system (that performs one or more operations according to one or more programming instructions/codes) installed in a vehicle. In an embodiment, the vehicle-computing device may have a unique identification code. In an embodiment, the vehicle-computing device may be utilized to display targeted multimedia items to a plurality of users (i.e., a ridesharing group) traveling in the vehicle. In an embodiment, the vehicle-computing device may present an interactive user-interface to the plurality of users. The plurality of users may provide feedback for the displayed targeted multimedia items by utilizing the interactive user-interface. In an embodiment, the vehicle-computing device may include a navigation device with inbuilt GPS sensors. Examples of the vehicle-computing device may include, but are not limited to, a desktop computer, a laptop, a personal digital assistant (PDA), a mobile device, a smartphone, and a tablet computer (e.g., iPad® and Samsung Galaxy Tab®).

A "ridesharing group" refers to a plurality of users that shares a vehicle for traveling from a first location to a second location. For example, a first user and a second user board a private taxi from a first location "A" to travel to a second location "B." In such a scenario, the first user and the second user constitute the ridesharing group. Hereinafter the terms "ridesharing group," "plurality of users," "group of users" may be used interchangeably, without deviating from the scope of the disclosure.

"Targeted multimedia items" refer to specific multimedia items that may be of interest to a group of users traveling in a vehicle (i.e., a ridesharing group or a plurality of users). In an embodiment, the targeted multimedia items may be determined, based on a plurality of features and/or feedbacks received from the ridesharing group. In an embodiment, the targeted multimedia items may be rendered on a computing device installed in the vehicle shared by the ridesharing group. Examples of the targeted multimedia items may include, but are not limited to, advertisements, offers, discounts, and/or coupons. Hereinafter the terms "targeted multimedia items" and "plurality of targeted multimedia items" may be used interchangeably, without deviating from the scope of the disclosure.

A "plurality of multimedia items" refers to a collection of multimedia items that is selected from another plurality of multimedia items based on a plurality of features and historical data associated with a ridesharing group. Examples of the plurality of multimedia items may include, but are not limited to, advertisements, offers, discounts, and/or coupons. In an embodiment, the plurality of multimedia items may be associated with a plurality of products and/or services.

A "vehicle" refers to an on-demand mode of transport utilized by a plurality of users to travel from a first location to a second location. For example, a first user and a second user board a private taxi from a first location "A" to travel to a second location "B." In such a scenario, the private taxi may correspond to the vehicle. Examples of the vehicle may include, but are not limited to, a bus, a truck, a car, and a ship. In an embodiment, the vehicle may be installed with a computing device, such as a vehicle-computing device.

A "unique product and/or service code" refers to a unique code for promotional offer associated with a product and/or service. In an embodiment, the unique product and/or service code may correspond to a group offer that can be availed by more than one user. In an embodiment, the utilization of the unique product and/or service code by a user or a plurality of users may be tracked. Examples of the unique product and/or service code may include, but are not limited to, a discount coupon, a reward coupon, a cashback offer, and a referral code.

A "feedback" refers to information pertaining to a combined response of a plurality of users regarding a multimedia item displayed to the plurality of users. In an embodiment, the feedback may either correspond to a synchronous feedback or an asynchronous feedback. The synchronous feedback may correspond to a feedback that is provided by the plurality of users within a pre-determined time interval associated with the display of the multimedia item. For example, if the plurality of users provide a feedback within "2 seconds" after the display of a multimedia item, when the pre-determined time interval is "3 seconds," the feedback corresponds to the synchronous feedback. The asynchronous feedback may correspond to a feedback that is provided by the plurality of users after a pre-determined time interval associated with the display of the multimedia item. For example, if the plurality of users provide a feedback "10 minutes" after the termination of the display of a multimedia item, when the pre-determined time interval is "3 seconds," the feedback corresponds to the asynchronous feedback. Examples of the feedback may include, but are not limited to, a combined assessment provided by the plurality of users and a utilization of a unique product and/or service code.

An "effectiveness score" refers to a score that is indicative of an impact of a multimedia item on a plurality of users. In an embodiment, the effectiveness score of a multimedia item may correspond to a likelihood of purchase and/or avail of a product and/or service associated with the multimedia item. For example, a high effectiveness score associated with a multimedia item may represent a higher positive impact of the multimedia item on a plurality of users as compared to another multimedia item with a lower effectiveness score.

A "pre-specified constraint" refers to a budget constraint, associated with a service, specified by a service provider. In an embodiment, the pre-specified constraint may correspond to the budget constraint specified by the service provider of a plurality of multimedia items. For example, the service provider may specify a budget constraint as "USD 5." Further, the cost of displaying a multimedia item on a vehicle-computing device, as charged by a service provider of a transportation service, is "USD 1." Therefore, only "5" multimedia items may be displayed on the vehicle-computing device. In such a scenario, "USD 5" corresponds to the pre-specified constraint.

A "plurality of features" represents aggregated preferences of all members (or users) of a ridesharing group. In an embodiment, the plurality of features may be extracted from user profiles of the members (or users) of the ridesharing group. The plurality of features may be representative of likes and dislikes of the members (or users) of a ridesharing group as a whole.

A "feedback history" corresponds to a feedback repository that comprises information pertaining to the feedback provided by each member of a ridesharing group for each multimedia item that is displayed to the ridesharing group. In an embodiment, the feedback history of the ridesharing group may be utilized to determine an effectiveness score of each displayed multimedia item. In an embodiment, the feedback history may be further utilized to select targeted multimedia items for the corresponding ridesharing group.

A "temporal reputation score" refers to a score, associated with a multimedia item, indicative of a temporal importance of the multimedia item. In an embodiment, the temporal reputation score of a multimedia item may be determined based on one or more predetermined factors, such as popularity, associated with the multimedia item. For example, a multimedia item associated with a popular brand has a higher temporal reputation score as compared to another multimedia item associated with a lesser known brand.

FIG. 1 is a block diagram of a system environment in which various embodiments may be implemented. With reference to FIG. 1, there is shown a system environment 100 that includes a plurality of user-computing devices 102 associated with a plurality of users 104. For instance, a first user-computing device 102A may be associated with a first user 104A, a second user-computing device 102B may be associated with a second user 104B, and a third user-computing device 102C may be associated with a third user 104C. The system environment 100 further includes a ridesharing server 106, an application server 108, a database server 110, and a vehicle 112 associated with a vehicle-computing device 114. Further, the plurality of users 104 may be traveling in the vehicle 112 along a route. The system environment 100 further includes a communication network 116. Various devices in the system environment 100 may be interconnected over the communication network 116. FIG. 1 shows, for simplicity, three user-computing devices, such as the first user-computing device 102A, the second user-computing device 102B, and the third user-computing device 102C, one ridesharing server, such as the ridesharing server 106, one application server, such as the application server 108, one database server, such as the database server 110, one vehicle, such as the vehicle 112, and one vehicle-computing device, such as the vehicle-computing device 114. However, it will be apparent to a person having ordinary skill in the art that the disclosed embodiments may also be implemented using multiple user-computing devices, multiple ridesharing servers, multiple application servers, multiple database servers, multiple vehicles, and multiple vehicle-computing devices, without departing from the scope of the disclosure.

Each of the plurality of user-computing devices 102 may refer to a computing device (associated with a user of the plurality of users 104) that may be communicatively coupled to the communication network 116. Each of the plurality of user-computing devices 102, such as the first user-computing device 102A, the second user-computing device 102B, and the third user-computing device 102C, may comprise one or more processors and one or more memory units. The one or more memory units may include computer readable codes and instructions that may be executable by the one or more processors to perform one or more predetermined operations specified by the corresponding user of the plurality of users 104.

In an embodiment, each of the plurality of users 104 may utilize the corresponding user-computing device among the plurality of user-computing devices 102 for registering on an online service platform, such as ridesharing service platform. During registration, each of the plurality of users 104 may transmit a corresponding user-profile to the ridesharing server 106. The user-profile may include user specific information, such as demographic details, user's interests, one or more preferences, and/or the like. In an embodiment, after registration, each of the plurality of users 104 may utilize the corresponding user-computing device among the plurality of user-computing devices 102 for transmitting a travel request to the ridesharing server 106 for availing a ridesharing service. For example, the first user 104A may wish to travel from a first location "A" to a second location "B." In this scenario, the first user 104A may utilize the first user-computing device 102A to transmit the travel request to the ridesharing server 106 seeking a vehicle for traveling from the first location "A" to the second location "B.

In an embodiment, each of the plurality of users 104 may have installed an application (e.g., a mobile app) on each of the corresponding plurality of user-computing devices 102. For example, the first user 104A may have installed the application on the first user-computing device 102A. In an embodiment, each of the plurality of users 104 may utilize the installed application to transmit the travel request to the ridesharing server 106. Further, each of the plurality of user-computing devices 102 may be configured to present vehicle information, pertaining to the corresponding travel request, received from the ridesharing server 106 to the corresponding user among the plurality of users 104. In an embodiment, the vehicle information may comprise an estimated time of arrival of a vehicle (such as the vehicle 112), a vehicle identification number of the vehicle, and/or the like.

In an embodiment, each of the plurality of users 104 may utilize the corresponding user-computing device among the plurality of user-computing devices 102 for providing a feedback for multimedia items displayed on the vehicle-computing device 114 while traveling in the vehicle 112. Each of the plurality of user-computing devices 102 may correspond to a variety of computing devices, such as, but not limited to, a laptop, a PDA, a smartphone, and a phablet, and a tablet computer (e.g. iPad® and Samsung Galaxy Tab®).

The ridesharing server 106 may refer to an electronic device, a computing device, or a software framework hosting an application or a software service that may be communicatively coupled to the communication network 116. In an embodiment, the ridesharing server 106 may be implemented to execute programs, routines, scripts, and/or the like, stored in one or more memory units for supporting the hosted application or the software service. In an embodiment, the hosted application or the software service may be configured to perform one or more predetermined operations as specified by a service provider of a transportation service. In an embodiment, the ridesharing server 106 may be associated with an online service platform, such as the ridesharing service platform. In an embodiment, the ridesharing server 106 may be configured to store the user profiles of registered users in the database server 110. In an embodiment, the ridesharing server 106 may be configured to process the travel request received from a user-computing device, such as the first user-computing device 102A, the second user-computing device 102B, and/or the third user-computing device 102C. After processing the travel request, the ridesharing server 106 may be configured to select a vehicle that matches the travel request. For example, the ridesharing server 106 may select the vehicle 112 based on a travel request (i.e., between a first location "A" and a second location "B") received from the first user-computing device 102A. The ridesharing server 106 may further select the vehicle 112 for other travel requests (i.e., between the first location "A" and the second location "B") received from other user-computing devices, such as the second user-computing device 102B and the third user-computing device 102C. Thus, the vehicle 112 may be shared among the first user 104A, the second user 104B, and the third user 104C while traveling from the first location "A" to the second location "B." In such a scenario, the first user 104A, the second user 104B, and the third user 104C collectively correspond to a ridesharing group for the vehicle 112.

After the selection of the vehicle that matches the travel request, the ridesharing server 106 may be configured to determine the vehicle information pertaining to the selected vehicle. Thereafter, the ridesharing server 106 may be configured to transmit the vehicle information to the user-computing device associated with the travel request. For example, the ridesharing server 106 may transmit the vehicle information of the vehicle 112 to the corresponding user-computing devices of the first user 104A, the second user 104B, and the third user 104C, who transmitted the travel requests to travel between the first location "A" and the second location "B."

In an embodiment, the ridesharing server 106 may be further configured to transmit a request to the application server 108 for displaying targeted multimedia items to a ridesharing group traveling in the selected vehicle 112. The targeted multimedia items may be displayed on a vehicle-computing device installed in the selected vehicle 112. In an embodiment, the request may comprise information pertaining to the ridesharing group traveling in the selected vehicle and information pertaining the computing device installed in the selected vehicle.

In an exemplary scenario, the ridesharing server 106 may transmit the request to the application server 108 for displaying targeted multimedia items, to the plurality of users 104 (i.e., the ridesharing group) traveling in the vehicle 112. The targeted multimedia items are displayed on the vehicle-computing device 114. The request comprises information pertaining to the plurality of users 104 traveling in the vehicle 112 and information pertaining to the vehicle-computing device 114.

The ridesharing server 106 may be realized through various types of application servers, such as, but not limited to, a Java application server, a .NET framework application server, a Base4 application server, a PHP framework application server, or any other application server framework.

The application server 108 may refer to an electronic device, a computing device, or a software framework hosting an application or a software service that may be communicatively coupled to the communication network 116. In an embodiment, the application server 108 may be implemented to execute programs, routines, scripts, and/or the like, stored in one or more memory units for supporting the hosted application or the software service. In an embodiment, the hosted application or the software service may be configured to perform one or more predetermined operations for displaying the targeted multimedia items to the ridesharing group.

In an embodiment, the application server 108 may be configured to receive the request from the ridesharing server 106. Based on the received request, the application server 108 may be configured to retrieve user profile of each member (i.e., a plurality of user profiles) of the ridesharing group from the database server 110. For example, if the plurality of users 104 is traveling in the vehicle 112, the application server 108 may retrieve the user profile of the first user 104A, the second user 104B, and the third user 104C from the database server 110.

Thereafter, the application server 108 may be configured to extract a plurality of features from the retrieved plurality of user profiles and historical data associated with the ridesharing group. In an embodiment, the plurality of features may comprise aggregated information pertaining to the one or more preferences and the demographic details of the members of the ridesharing group.

In an embodiment, the application server 108 may be configured to select a plurality of multimedia items from another plurality of multimedia items based on the plurality of features and/or a feedback history of the ridesharing group. The application server 108 may utilize one or more explore-exploit techniques, such as mixed bandit technique (or contextual bandits), and/or one or more similarity measuring techniques, such as cosine vector similarity technique, known in the art for the selection of the plurality of multimedia items. In an embodiment, the plurality of multimedia items may be associated with a plurality of products and/or services. Prior to the selection, in an embodiment, the application server 108 may retrieve the other plurality of multimedia items and the feedback history of the ridesharing group from the database server 110. Further, the application server 108 may be configured to transmit the selected plurality of multimedia items to the vehicle-computing device installed in the vehicle associated with the request. In an embodiment, at least a transmitted multimedia item of the plurality of multimedia items may be associated with a unique product and/or service code, such as a coupon code, a discount code, and/or the like.

Further, the application server 108 may be configured to receive at least one feedback provided by the ridesharing group on each of the transmitted plurality of multimedia items. In an embodiment, the at least one feedback may correspond to a utilization of the unique product and/or service code and/or a combined assessment provided by the ridesharing group in real-time for each of the plurality of multimedia items. In an embodiment, the application server 108 may be further configured to determine an effectiveness score for each of the transmitted plurality of multimedia items based on the corresponding at least one feedback received from the ridesharing group. In an embodiment, the effectiveness score of a multimedia item may be indicative of a strength of relevance of the multimedia item for the ridesharing group.

Thereafter, in an embodiment, the application server 108 may be configured to select a plurality of targeted multimedia items from the plurality of multimedia items in real-time based on the determined effectiveness score and a pre-specified constraint. In an embodiment, the pre-specified constraint may correspond to a budget constraint as specified by a service provider associated with the plurality of multimedia items. After the selection of the plurality of targeted multimedia items, the application server 108 may be configured to prioritize the targeted multimedia items based on the effectiveness score and/or a temporal reputation score associated with each of the plurality of targeted multimedia items. In an embodiment, the temporal reputation score of a targeted multimedia item may be indicative of a temporal importance of the targeted multimedia item. Thereafter, the application server 108 may be configured to transmit the plurality of targeted multimedia items in the prioritized order to the vehicle-computing device installed in the vehicle 112. The application server 108 may utilize the vehicle information in the request received from the ridesharing server 106 for identifying the vehicle-computing device to which the plurality of targeted multimedia items is to be transmitted.

In an embodiment, the application server 108 may be configured to update the effectiveness score of each of the plurality of targeted multimedia items based on the at least one feedback received from the ridesharing group on each of the plurality of targeted multimedia items. Further, the application server 108 may be configured to update the feedback history of the ridesharing group based on the at least one feedback received on each of the plurality of multimedia items and/or the plurality of targeted multimedia items.

In an embodiment, the application server 108 may be further configured to update the selection of the plurality of targeted multimedia items based on the at least one feedback for each of the plurality of targeted multimedia items and the updated feedback history of the ridesharing group. In an embodiment, when the trip of the ridesharing group terminates, the application server 108 may be configured to store the updated effectiveness score of each of the plurality of targeted multimedia items for the ridesharing group in the database server 110, over the communication network 116.

The application server 108 may be realized through various types of application servers, such as, but not limited to, a Java application server, a .NET framework application server, a Base4 application server, a PHP framework application server, or any other application server framework. An embodiment of the structure of the application server 108 has been discussed later in FIG. 2.

The database server 110 may refer to a computing device that may be communicatively coupled to the communication network 116. In an embodiment, the database server 110 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 110 may be configured to store the other plurality of multimedia items. In an embodiment, the database server 110 may be further configured to store the user profiles of users, such as the plurality of users 104, who are registered on the ridesharing service platform. In an embodiment, the database server 110 may be further configured to store a group profile of each of one or more ridesharing groups that has traveled in one or more vehicles, such as the vehicle 112, associated with the service provider of the transportation service. In an embodiment, the group profile of a ridesharing group may comprise the feedback history of the ridesharing group and the plurality of features of the ridesharing group. The feedback history of the ridesharing group may further comprise previous feedback, on previously displayed multimedia items, provided by the ridesharing group. In an embodiment, the database server 110 may be further configured to store the historical data of each user registered on the ridesharing service platform. In an embodiment, the database server 110 may be configured to receive one or more queries from the application server 108 for the selection of the plurality of multimedia items from the other plurality of multimedia items. Further, the database server 110 may receive one or more queries from the application server 108 to update the feedback history and store the updated effectiveness score of the plurality of targeted multimedia items for the corresponding ridesharing group.

For querying the database server 110, one or more querying languages, such as, but not limited to, SQL, QUEL, and DMX, may be utilized. In an embodiment, the database server 110 may connect to the application server 108, using one or more protocols, such as, but not limited to, the ODBC protocol and the JDBC protocol. In an embodiment, the database server 110 may be realized through various technologies such as, but not limited to, Microsoft® SQL Server, Oracle®, IBM DB2®, Microsoft Access®, PostgreSQL®, MySQL® and SQLite®.

A person having ordinary skill in the art will appreciate that the scope of the disclosure is not limited to realizing the ridesharing server 106, the application server 108, and the database server 110 as separate entities. In an embodiment, the functionalities of the ridesharing server 106 and the database server 110 can be integrated into the application server 108, without departing from the scope of the disclosure.

The vehicle 112 may be a transportation means that may facilitate a transportation service utilized by a ridesharing group to commute from the first location (i.e., a source location) to the second location (i.e., a destination location). In an embodiment, the vehicle 112 may correspond to a pooled-vehicle associated with the ridesharing service platform. In an embodiment, the vehicle 112 may be selected by the ridesharing server 106 based on the travel requests of the ridesharing group. In an embodiment, the vehicle 112 may be installed with the vehicle-computing device 114. The vehicle 112 may correspond to a variety of transportation services, such as, but not limited to, a bus, a truck, a car, and a ship.

The vehicle-computing device 114 may refer to a computing device, installed in the vehicle 112, which may be communicatively coupled to the communication network 116. Further, the vehicle-computing device 114 may include one or more processors and one or more memory units. The one or more memory units may include a computer readable code that may be executable by the one or more processors to perform one or more operations as specified by the service provider and/or a driver of the vehicle 112. In an embodiment, the vehicle-computing device 114 may comprise a navigation device with inbuilt GPS sensors. In an embodiment, the vehicle-computing device 114 may receive the plurality of multimedia items and/or the plurality of targeted multimedia items from the application server 108. The vehicle-computing device 114 may further display the received plurality of multimedia items and/or the plurality of targeted multimedia items to the ridesharing group traveling in the vehicle 112. Further, in an embodiment, the vehicle-computing device 114 may be utilized by the ridesharing group to provide the at least one feedback on each of the plurality of multimedia items and/or the plurality of targeted multimedia items. In an embodiment, the at least one feedback may correspond to the combined assessment provided by the ridesharing group in real-time. Further, the vehicle-computing device 114 may be configured to transmit the at least one feedback to the application server 108 for further processing.

The vehicle-computing device 114 may correspond to a variety of computing devices, such as, but not limited to, a laptop, a PDA, a tablet computer, a smartphone, and a phablet.

A person having ordinary skill in the art will appreciate that the scope of the disclosure is not limited to realizing the application server 108 and the vehicle-computing device 114, as separate entities. In an embodiment, the application server 108 may be realized as an application program installed on and/or running on the vehicle-computing device 114, without deviating from the scope of the disclosure.

The communication network 116 may correspond to a medium through which content and messages flow between various devices, such as the plurality of user-computing devices 102, the ridesharing server 106, the application server 108, the database server 110, and vehicle-computing device 114, of the system environment 100. Examples of the communication network 116 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 116 in accordance with various wired and wireless communication protocols, such as Transmission Control Protocol and Internet Protocol (TCP/IP), User Datagram Protocol (UDP), and 2G, 3G, or 4G communication protocols.

Figure 2:
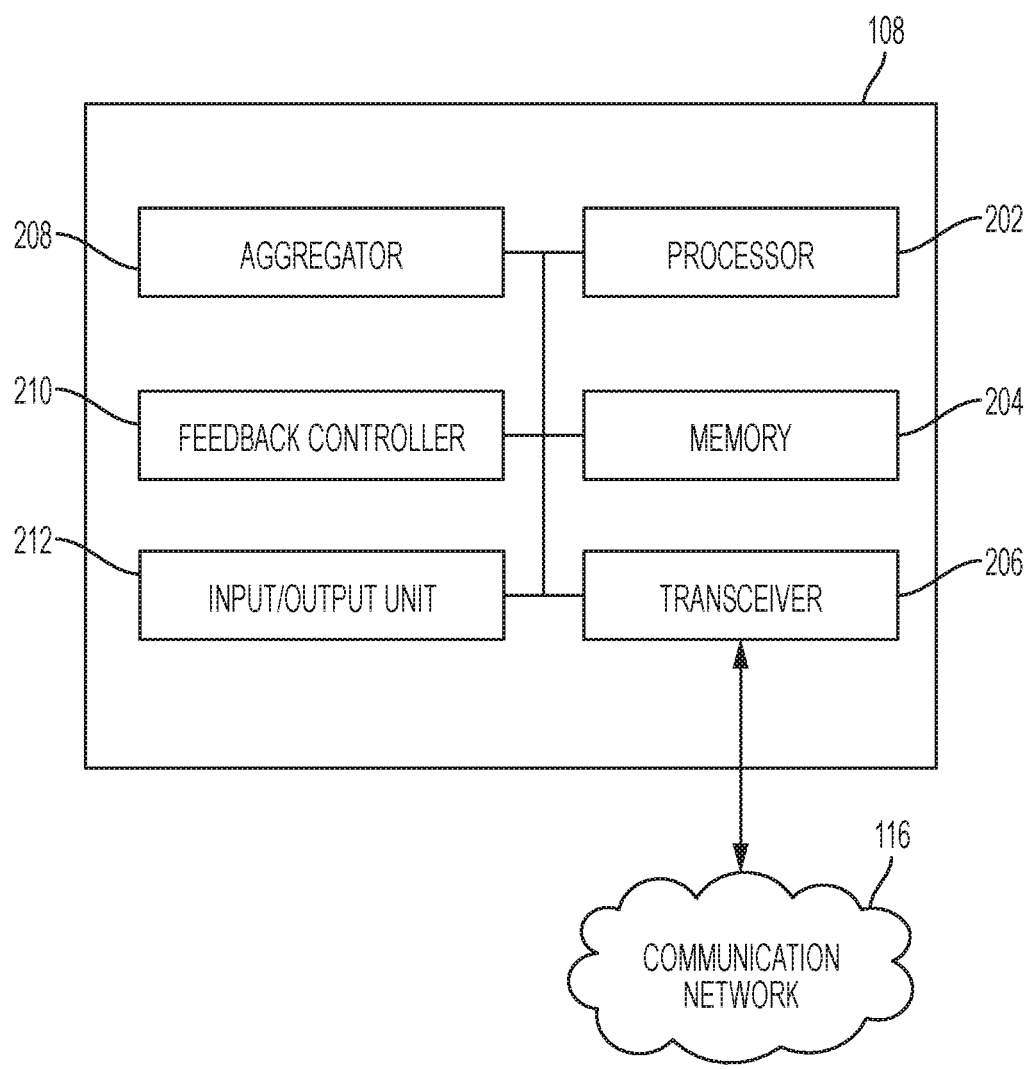
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 108 that may include a processor 202, a memory 204, a transceiver 206, an aggregator 208, a feedback controller 210, and an input/output unit 212. The processor 202 is communicatively coupled to the memory 204, the transceiver 206, the aggregator 208, the feedback controller 210, and the input/output unit 212.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for displaying targeted multimedia items to the ridesharing group. In an embodiment, the processor 202 may be configured to select the plurality of multimedia items from the other plurality of multimedia items based on the plurality of features and/or the feedback history associated with the ridesharing group. In an embodiment, the processor 202 may be configured to determine the effectiveness score for each of the plurality of multimedia items based on the at least one feedback, received from the vehicle-computing device 114 and/or the user-computing devices 102, for each of the plurality of multimedia items.

In an embodiment, the processor 202 may be configured to select the plurality of targeted multimedia items from the plurality of multimedia items. Further, the processor 202 may be configured to prioritize the targeted multimedia items among the plurality of targeted multimedia items. In an embodiment, the processor 202 may be configured to update the selection of the plurality of targeted multimedia items and the effectiveness score associated with each of the plurality of targeted multimedia items based on the at least one feedback, received from the vehicle-computing device 114 and/or the plurality of user-computing devices 102, for each of the plurality of targeted multimedia items. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the aggregator 208, the feedback controller 210, and the input/output unit 212. In an embodiment, the memory 204 may include one or more buffers (not shown). The one or more buffers may store the plurality of features and the determined effectiveness scores. Examples of some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations for displaying the plurality of targeted multimedia items to the ridesharing group. It will be apparent to a person having ordinary skill in the art that the one or more instructions stored in the memory 204 may enable the hardware of the application server 108 to perform the one or more predetermined operations, without deviating from the scope of the disclosure.

The transceiver 206 transmits/receives messages and data to/from various components, such as the plurality of user-computing devices 102, the ridesharing server 106, the database server 110, and the vehicle-computing device 114 of the system environment 100, over the communication network 116. In an embodiment, the transceiver 206 may be communicatively coupled to the communication network 116. In an embodiment, the transceiver 206 may be configured to transmit the plurality of multimedia items and the plurality of targeted multimedia items to the vehicle-computing device 114 installed in the vehicle 112. In an embodiment, the transceiver 206 may be configured to receive the at least one feedback provided by the plurality of users 104 for each of the transmitted plurality of multimedia items and the transmitted plurality of targeted multimedia items. In an embodiment, the transceiver 206 may receive the at least one feedback from the vehicle-computing device 114 or the plurality of user-computing devices 102. Examples of the transceiver 206 may include, but are not limited to, an antenna, an Ethernet port, a USB port, or any other port configured to receive and transmit data. The transceiver 206 transmits/receives the messages and data, in accordance with the various communication protocols, such as TCP/IP, UDP, and 2G, 3G, or 4G communication protocols.

The aggregator 208 includes suitable logic, circuitry, and/or interfaces that are configured to execute the one or more sets of instructions stored in the memory 204. The aggregator 208 may be configured to extract one or more features from the user profile of each user among the plurality of users 104. Further, the aggregator 208 may be configured to aggregate the one or more features extracted from user profile of each user among the plurality of users 104 to generate the plurality of features. In an embodiment, the plurality of features may comprise aggregated information pertaining to the one or more preferences and the demographic details of the plurality of users 104. In an embodiment, the aggregator 208 may utilize one or more aggregation algorithms retrieved from the memory 204 for aggregating the one or more features extracted from each user profile. Examples of the one or more aggregation algorithms retrieved from the memory 204 may include, but are not limited to, the homomorphic aggregation algorithm and the binary aggregation algorithm. In an embodiment, the aggregator 208 may include one or more electronic circuits and/or gates that are capable of aggregating the extracted one or more features. The aggregator 208 may be realized through various electronic components, such as, but not limited to, a system on chip (SoC) component, an application-specific integrated circuit (ASIC) component, or a field-programmable gate array (FPGA) component.

Though the aggregator 208 is depicted as a separate entity, a person skilled in the art will appreciate that the scope of the disclosure is not limited to realizing functionality of the aggregator 208 by the processor 202. In an embodiment, the aggregator 208 may be implemented within the processor 202 without departing from the spirit of the disclosure. Further, a person skilled in the art will understand that the scope of the disclosure is not limited to realizing the aggregator 208 as a hardware component. In an embodiment, the aggregator 208 may be implemented as a software module included in computer program code (stored in the memory 204), which may be executable by the processor 202 to perform the functionalities of the aggregator 208.

The feedback controller 210 includes suitable logic, circuitry, and/or interfaces that are configured to execute the one or more sets of instructions stored in the memory 204. In an embodiment, the feedback controller 210 may be configured to process the at least one feedback provided by the plurality of users 104 for each of the plurality of multimedia items and the plurality of targeted multimedia items for updating the feedback history. In an embodiment, the feedback controller 210 may include one or more electronic circuits and/or gates that are capable of processing the received at least one feedback. The feedback controller 210 may be realized through various electronic components, such as, but not limited to, a SoC component, an ASIC component, or an FPGA component.

Though the feedback controller 210 is depicted as a separate entity, a person skilled in the art will appreciate that the scope of the disclosure is not limited to realizing functionality of the feedback controller 210 by the processor 202. In an embodiment, the feedback controller 210 may be implemented within the processor 202 without departing from the spirit of the disclosure. Further, a person skilled in the art will understand that the scope of the disclosure is not limited to realizing the feedback controller 210 as a hardware component. In an embodiment, the feedback controller 210 may be implemented as a software module included in computer program code (stored in the memory 204), which may be executable by the processor 202 to perform the functionalities of the feedback controller 210.

The input/output unit 212 may comprise suitable logic, circuitry, interfaces, and/or code that may be configured to provide an output to the plurality of users 104. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The working of the application server 108 for displaying targeted multimedia items to a ridesharing group has been explained later in FIGS. 3A and 3B.

Figure 3A:
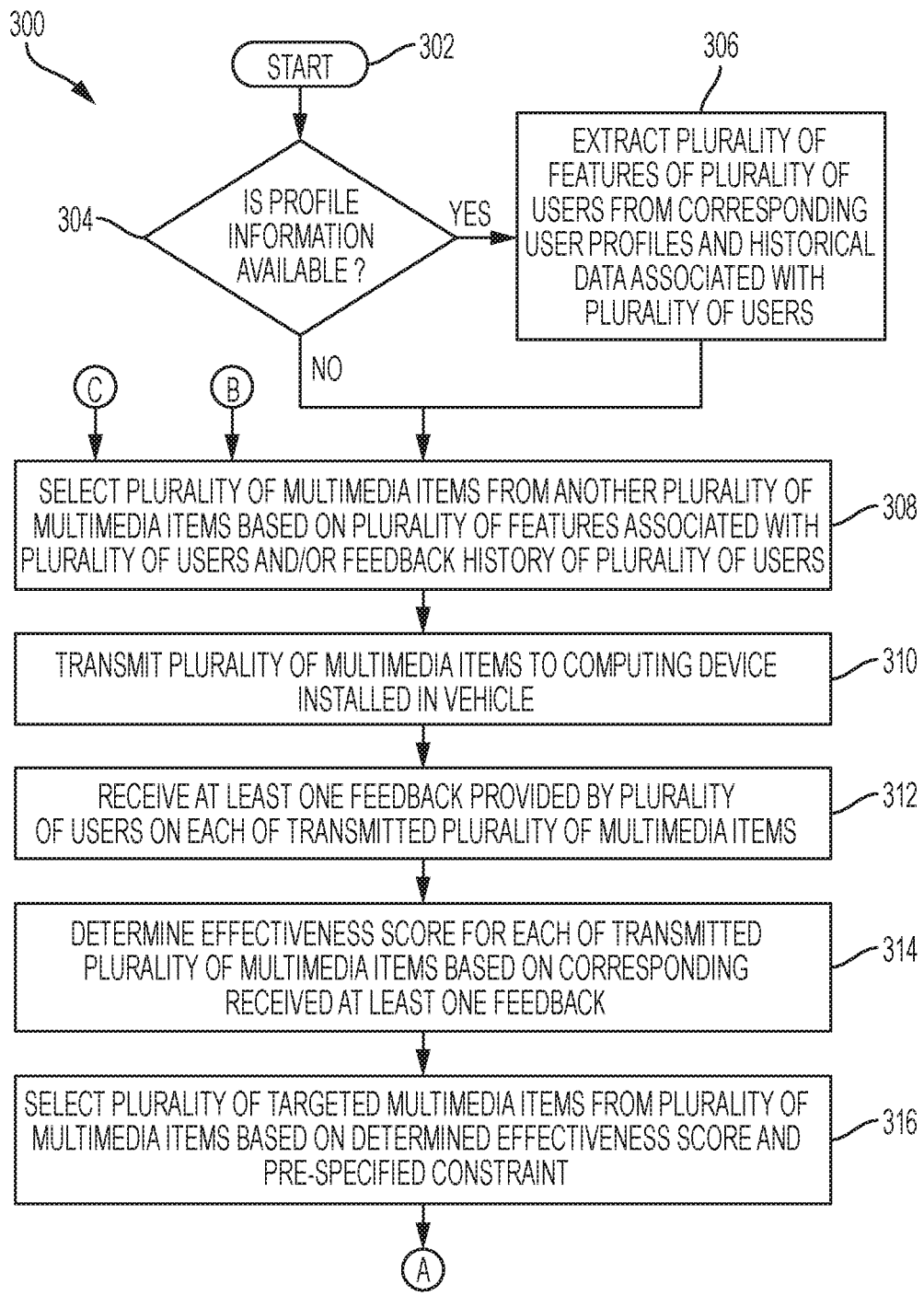
FIGS. 3A and 3B, collectively, depict a flowchart that illustrates a method for displaying targeted multimedia items to a ridesharing group, with unobserved plurality of features, traveling together in a vehicle for the first time, in accordance with at least one embodiment.
Figure 3B:
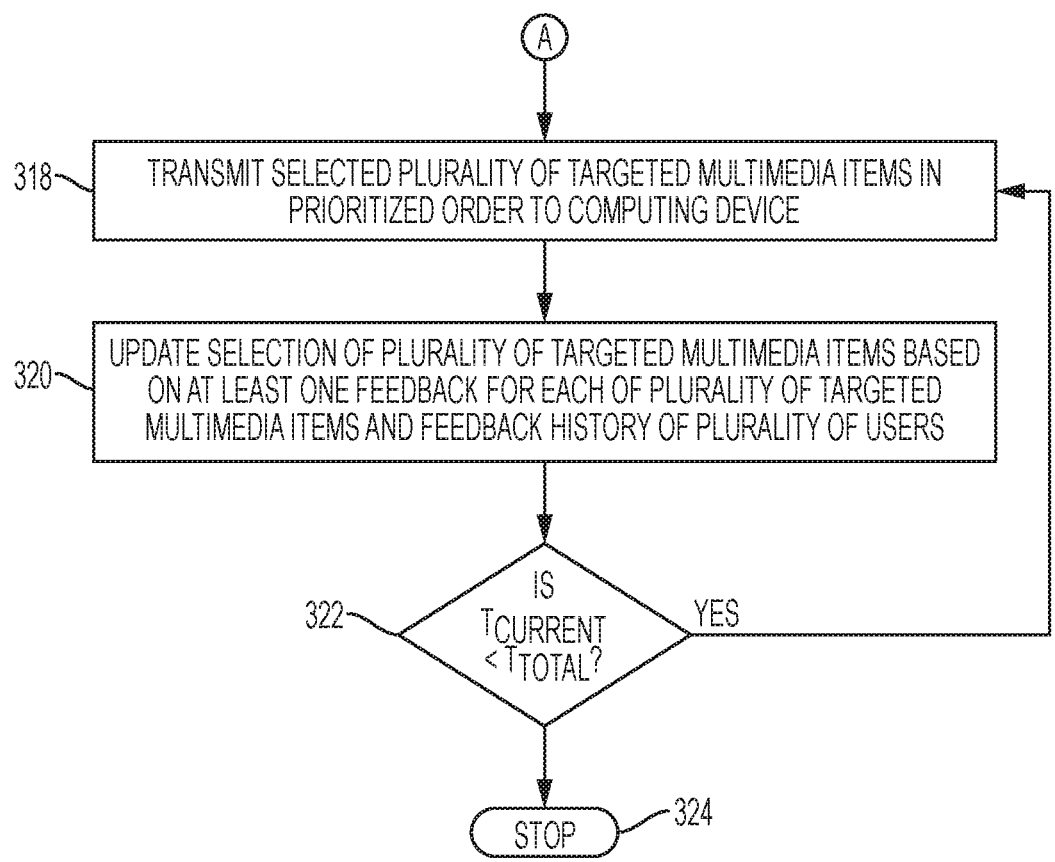

FIGS. 3A and 3B collectively depict a flowchart that illustrates a method of displaying targeted multimedia items to a ridesharing group, traveling together in a vehicle for the first time, with unobserved plurality of features, in accordance with at least one embodiment. FIGS. 3A and 3B are collectively described in conjunction with FIG. 1 and FIG. 2. With reference to FIGS. 3A and 3B, there is shown a flowchart 300 that illustrates a method of displaying targeted multimedia items to a ridesharing group, traveling together in a vehicle for the first time, with unobserved plurality of features. A person having ordinary skill in the art will understand that the examples, as described in FIGS. 3A and 3B, are for illustrative purpose and should not be construed to limit the scope of the disclosure. The method starts at step 302 and proceeds to step 304.

At step 304, a check is performed to determine whether the profile information associated with the plurality of users 104 is available. In an embodiment, the processor 202 may be configured to perform the check to determine whether the profile information associated with the plurality of users 104 is available. In an embodiment, the processor 202 may be configured to perform the check after receiving the request from the ridesharing server 106.

Before transmitting the request to the processor 202, the ridesharing server 106 may be configured to select the vehicle 112 that matches the travel requests received from corresponding user-computing devices of the plurality of users 104. Thereafter, the ridesharing server 106 may transmit the request to the processor 202 for displaying the targeted multimedia items to the plurality of users 104. In an embodiment, the request may comprise information, such as user identification details, pertaining to the plurality of users 104 (i.e., the ridesharing group) traveling in the vehicle 112 and information, such as vehicle-computing device identification details, pertaining to the vehicle-computing device 114 installed in the vehicle 112.

Thereafter, the processor 202 may utilize the user identification details of each of the plurality of users 104 to determine whether the profile information associated with the plurality of users 104 is available or not. In a scenario, when the processor 202 determines that the profile information associated with the plurality of users 104 is available, the processor 202 may be configured to query the database server 110 to retrieve the user profiles of each of the plurality of users 104 and the control passes to step 306. Else, the control passes to step 308.

At step 306, the plurality of features of the plurality of users 104 is extracted from the user profiles and the historical data associated with the plurality of users 104. In an embodiment, the aggregator 208, in conjunction with the processor 202, may be configured to extract the plurality of features of the plurality of users 104 from the user profiles and the historical data associated with the plurality of users 104. In an embodiment, the historical data of a user may comprise information pertaining to web browsing history, purchase or transaction details of the corresponding user.

In an embodiment, the aggregator 208 may be configured to extract the one or more features from the user profile and the historical data of each user, such as the first user 104A, the second user 104B, and the third user 104C, among the plurality of users 104. Further, the aggregator 208 may be configured to aggregate the one or more features extracted from the user profile and the historical data of each user to generate the plurality of features. In an embodiment, the plurality of features may comprise aggregated information pertaining to the one or more preferences and the demographic details of the plurality of users 104. In an embodiment, the aggregator 208 may utilize the one or more aggregation algorithms, retrieved from the memory 204, for aggregating the one or more features extracted from each user profile. Examples of the one or more aggregation algorithms retrieved from the memory 204 may include, but are not limited to, the homomorphic aggregation algorithm and the binary aggregation algorithm. Thereafter, the processor 202 may be configured to create a group profile of the plurality of users 104. The group profile of the plurality of users 104 may comprise the plurality of features of the plurality of users 104. In an embodiment, the processor 202, in conjunction with the transceiver 206, may be further configured to store the group profile of the plurality of users 104 in the database server 110, over the communication network 116.

In an exemplary scenario, the user profile of each user among the plurality of users 104 may be represented by a vector of d features (i.e., the one or more features). Thus, the aggregator 208 may extract the vector of d features from the user profile of each user among the plurality of users 104. Further, if the plurality of users 104 comprises k users, the aggregator 208 may generate an aggregated feature vector (i.e., the plurality of features) of dimension kd.

A person having ordinary skill in the art will understand that the abovementioned exemplary scenario is for illustrative purpose and should not be construed to limit the scope of the disclosure.

At step 308, the plurality of multimedia items is selected from the other plurality of multimedia items based on the plurality of features associated with the plurality of users 104 and/or the feedback history of the plurality of users 104. In an embodiment, the processor 202, in conjunction with the aggregator 208, may be configured to select the plurality of multimedia items from the other plurality of multimedia items based on the plurality of features associated with the plurality of users 104 and/or the feedback history of the plurality of users 104. In an embodiment, the feedback history of the plurality of users 104 may comprise previous feedback, on previously displayed multimedia items, provided by the plurality of users 104.

In an embodiment, when the user profiles of the plurality of users 104 are unavailable, the selection of the plurality of multimedia items from the other plurality of multimedia items is only based on the feedback history of the plurality of users 104. Further, when the plurality of users 104 is traveling together in the vehicle 112 for the first time, the feedback history of the plurality of users 104 may not comprise any information. In this scenario, the processor 202 may be configured to select all multimedia items (i.e., the plurality of multimedia items) from the other plurality of multimedia items. In this scenario, the processor 202 may utilize one or more explore-exploit techniques, such as mixed bandit technique, for the selection of the plurality of multimedia items.

In another embodiment, when the user profiles of the plurality of users 104 are available, the selection of the plurality of multimedia items from the other plurality of multimedia items is based on the plurality of features associated with the plurality of users 104 and the feedback history of the plurality of users 104. Further, when the plurality of users 104 is traveling together in the vehicle 112 for the first time, the feedback history of the plurality of users 104 may not comprise any information. In this scenario, the processor 202 may be configured to select the plurality of multimedia items from the other plurality of multimedia items based on only the plurality of features. In other words, the processor 202 may be configured to select actions (i.e., the plurality of multimedia items) that maps to observed context (i.e., the plurality of features) associated with the plurality of users 104. The processor 202 may utilize one or more similarity measuring techniques, such as cosine similarity technique, known in the art for the selection of the plurality of multimedia items.

However, if the plurality of users 104 has previously traveled together in the vehicle 112, the feedback history of the plurality of users 104 may also be utilized along with the plurality of features to select the plurality of multimedia items from the other plurality of multimedia items. In this scenario, the processor 202 may utilize the one or more explore-exploit techniques, such as contextual bandits, and/or one or more similarity measuring techniques, such as cosine vector similarity technique, known in the art for the selection of the plurality of multimedia items.

At step 310, the plurality of multimedia items is transmitted to the vehicle-computing device 114 installed in the vehicle 112. In an embodiment, the processor 202, in conjunction with the transceiver 206, may be configured to transmit the plurality of multimedia items to the vehicle-computing device 114 installed in the vehicle 112. Before transmitting the plurality of multimedia items, the processor 202 may be configured to establish a communication link with the vehicle-computing device 114. The processor 202 may utilize the vehicle identification details, in the request received from the ridesharing server 106, to identify the vehicle-computing device 114 for establishing the communication link. Once the communication link is established, the processor 202 in conjunction with the transceiver 206 may transmit the plurality of multimedia items to the vehicle-computing device 114. Thereafter, in an embodiment, the transmitted plurality of multimedia items may be displayed to the plurality of users 104 traveling in the vehicle 112 on a display screen of the vehicle-computing device 114. In an embodiment, at least a transmitted multimedia item of the plurality of multimedia items may be associated with a unique product and/or service code, such as a discount coupon code, a referral code, and/or the like.

At step 312, the at least one feedback provided by the plurality of users 104 on each of the transmitted plurality of multimedia items is received. In an embodiment, the processor 202, in conjunction with the transceiver 206, may be configured to receive the least one feedback provided by the plurality of users 104 on each of the transmitted plurality of multimedia items. In an embodiment, the plurality of users 104 may provide the at least one feedback by utilizing the vehicle-computing device 114. In another embodiment, the plurality of users 104 may provide the at least one feedback by utilizing the corresponding user-computing devices, such as the first user-computing device 102A, the second user-computing device 102B, and the third user-computing device 102C. In an embodiment, the at least one feedback may correspond to the combined assessment provided by the plurality of users 104. In other words, the processor 202 may be configured to collect rewards (i.e., the at least one feedback) on each of the transmitted plurality of multimedia items.

In an exemplary scenario, the plurality of users 104 may be presented a user-interface on the vehicle-computing device 114 after a first multimedia item, among the plurality of multimedia items, is presented to the plurality of users 104. The user-interface may comprise one or more options, such as "like," "dislike," or "report as spam," that are to be selected by the plurality of users 104 based on their perception of the first multimedia item. For example, based on a combined decision the plurality of users 104 may select an option "like" for the first multimedia items. In this scenario, the option selected by the plurality of users 104 may correspond to the at least one feedback.

In another exemplary scenario, the plurality of users 104 may be presented another user-interface on the vehicle-computing device 114 after the first multimedia item, among the plurality of multimedia items, is presented to the plurality of users 104. The user-interface may comprise an input section, where the plurality of users 104 may provide a combined assessment pertaining to the first multimedia item based on their perception of the first multimedia item. For example, based on a combined decision the plurality of users 104 may provide a combined review, such as "We like this multimedia item." In this scenario, the combined assessment provided by the plurality of users 104 may correspond to the at least one feedback.

In another exemplary scenario, the plurality of users 104 may be presented one or more options, such as "skip" and "continue to view," on the vehicle-computing device 114 while the first multimedia item, among the plurality of multimedia items, is displayed. The plurality of users 104 may select one option from the one or more options. For example, when the plurality of users 104 selects the option "skip," the multimedia item (i.e., the first multimedia item) that is currently being displayed to the plurality of users 104 is skipped and the next multimedia item (i.e., a second multimedia item among the plurality of multimedia items) is displayed. However, when the plurality of users 104 selects the option "continue to view," the current multimedia item (i.e., the first multimedia item) is not skipped. In this scenario, the option, such as "skip" or "continue to view," selected by the plurality of users 104 may correspond to the at least one feedback provided by the plurality of users 104.

A person having ordinary skill in the art will understand that the scope of the disclosure is not limited to the use of the vehicle-computing device 114 for providing the at least one feedback. In an alternate embodiment, the user interface for providing the at least one feedback may be displayed on the user-computing device, such as the first user-computing device 102A, the second user-computing device 102B, and the third user-computing device 102C, of each user, such as the first user 104A, the second user 104B, and the third user 104C, among the plurality of users 104. Further, each user may provide an individual feedback for the displayed multimedia item among the plurality of multimedia items. Thereafter, the processor 202, in conjunction with the feedback controller 210, may process the individual feedbacks of the plurality of users 104 to determine a combined feedback. The combined feedback determined by the processor 202 may correspond to the at least one feedback for the corresponding multimedia item. For example, if two out of three users among the plurality of users 104 select the option "skip" by utilizing the corresponding user-computing device, the currently displayed multimedia items may be skipped and the next multimedia item may be displayed.

A person having ordinary skill in the art will understand that the abovementioned exemplary scenarios are for illustrative purpose and should not be construed to limit the scope of the disclosure.

In another embodiment, when the displayed multimedia item is associated with the unique product and/or service code, the at least one feedback may further correspond to the utilization of the unique product and/or service code. In an embodiment, the processor 202 may be configured to track the utilization of the unique product and/or service code. Further, the processor 202 may be configured to receive a notification when the unique product and/or service code is utilized. In an embodiment, the unique product and/or service code may be utilized within a pre-determined time interval associated with the multimedia item. In another embodiment, the unique product and/or service code may be utilized after the lapse of the pre-determined time interval associated with the multimedia item.

In an exemplary scenario, after the first multimedia item associated with a product "A" is displayed to the plurality of users 104, a discount coupon code associated with the product "A" is presented on the display screen of the vehicle-computing device 114. Further, one or more users, such as the first user 104A, the second user 104B, or the third user 104C, among the plurality of users 104 may utilize the discount coupon code to purchase the product after the lapse of the pre-determined time interval (i.e., "3 seconds") associated with the first multimedia item. The processor 202 may get the notification at the utilization of the discount coupon code. In such a scenario, the notification may correspond to the at least one feedback associated with the first multimedia item.

A person having ordinary skill in the art will understand that the abovementioned exemplary scenario is for illustrative purpose and should not be construed to limit the scope of the disclosure.

After receiving the at least one feedback, the feedback controller 210 may be configured to process the at least one feedback associated with each multimedia item among the plurality of multimedia items to update the feedback history of the plurality of users 104. In an embodiment, the update of the feedback history may be in real-time, when the at least one feedback may be received. In other words, the feedback controller 210 may be configured to update the feedback history based on the collected rewards (i.e., the at least one feedback).

At step 314, the effectiveness score for each of the transmitted plurality of multimedia items is determined based on the corresponding at least one feedback received from the ridesharing group. In an embodiment, the processor 202, in conjunction with the feedback controller 210, may be configured to determine the effectiveness score for each of the transmitted plurality of multimedia items based on the corresponding at least one feedback received from the ridesharing group. In an embodiment, the effectiveness score of a transmitted multimedia item may be indicative of an impact of the multimedia item on the plurality of users 104. Further, the effectiveness score of a transmitted multimedia item may be associated with a likelihood of purchase and/or avail of the product and/or service associated with the transmitted multimedia item. For example, a high effectiveness score associated with a multimedia item may represent a higher positive impact of the multimedia item on the plurality of users 104 as compared to another multimedia item with a lower effectiveness score. In an embodiment, the effectiveness score of a multimedia item may be determined as a function of the at least one feedback associated with the multimedia item and a count of times the multimedia item is presented to the plurality of users 104.

At step 316, the plurality of targeted multimedia items is selected from the plurality of multimedia items based on the determined effectiveness score and the pre-specified constraint. In an embodiment, the processor 202 may be configured to select the plurality of targeted multimedia items from the plurality of multimedia items based on the determined effectiveness score and/or the pre-specified constraint. In other words, the processor 202 may be configured to learn a good policy (i.e., the selection of the targeted multimedia items) that maps the context to actions and rewards seen so far (i.e., the at least one feedback received on each of the plurality of multimedia items). The processor 202 may be configured to utilize one or more explore-exploit techniques, such as contextual bandits, for the selection of the plurality of targeted multimedia items. Further, the processor 202 may be configured to ensure that the likelihood of selection of a multimedia item as a targeted multimedia item is unbiased. Thus, the chances of selection of a multimedia item as a targeted multimedia is same for each of the plurality of multimedia items and is only based on the determined effectiveness score and the pre-specified constraint.

In an exemplary scenario, the processor 202 may utilize equation (1) as shown below to select the plurality of targeted multimedia items from the plurality of multimedia items based on the effectiveness score:

$$a = \arg\max_{a \in A} \frac{\text{positive feedback count}_{g,a}}{\text{count}_{g,a}} + \sqrt{\frac{\log t}{\text{count}_{g,a}}} \quad (1)$$

where, a represents a selected targeted multimedia item from the plurality of multimedia items A for a ridesharing group g among one or more ridesharing groups G;

positive feedback count$_{g,a}$ represents a count of positive feedbacks (or rewards) provided by the ridesharing group g on the multimedia item a;

count$_{g,a}$ represents a number of times the multimedia item a among the plurality of multimedia items A is displayed to the ridesharing group g; and t represents a counter variable that indicates a count of times the processor 202 has selected any multimedia item from the plurality of multimedia items A as the targeted multimedia item.

As shown above, the processor 202 may be configured to select the plurality of targeted multimedia items from the plurality of multimedia items for which the effectiveness score $$\left(\text{i.e., } \frac{\text{positive feedback count}_{g,a}}{\text{count}_{g,a}} + \sqrt{\frac{\log t}{\text{count}_{g,a}}}\right)$$

is maximized.

A person having ordinary skill in the art will understand that the abovementioned exemplary scenario is for illustrative purpose and should not be construed to limit the scope of the disclosure.

In an embodiment, the processor 202 may be configured to select the plurality of targeted multimedia items from the plurality of multimedia items in a way that expected revenue associated with the plurality of targeted multimedia items may be maximized. In other words, the processor 202 may be configured to select the plurality of targeted multimedia items from the plurality of multimedia items in a way that a regret associated with the plurality of targeted multimedia items may be minimized. In an embodiment, the pre-specified constraint may correspond to a budget constraint as specified by the service provider. In an embodiment, when the service provider has not specified any constraint, the processor 202 may be configured to select the plurality of targeted multimedia items from the plurality of multimedia items that maximize the effectiveness score or the benefits, such as expected revenue for a rideshare operator associated with the ridesharing server 106. In another embodiment, when the service provider has specified the constraint, the processor 202 may be configured to select the plurality of targeted multimedia items from the plurality of multimedia items that maximize the effectiveness (i.e., the expected revenue) and meet the pre-specified constraint.

In an exemplary scenario, a service provider associated with the plurality of multimedia items may specify the constraint, such as a budget constraint $C_a$. Further, a cost of displaying a multimedia item on the vehicle-computing device 114, as charged by a service provider of a transportation service (such as the vehicle 112), may be $x_a$. In order to meet the budget constraint $C_a$, the processor 202 may be configured to select $c_a/x_a$ multimedia items (i.e., the plurality of target multimedia items) from the plurality of multimedia items. The processor 202 may select the plurality of targeted multimedia items for which the effectiveness score is maximized. For the selection of the plurality of targeted multimedia items, the processor 202 may be configured to utilize one or more maximization algorithms known in the art. The processor 202 may formulate a maximization problem for selecting the plurality of targeted multimedia items from the plurality of multimedia items using the following conditions:

$$\max \Sigma_{g \in G, a \in A} v_{g,a} x_{g,a} \quad (2)$$

$$\text{such that } \Sigma_a x_{g,a} = 1 \, \forall g \in G \quad (3)$$

$$\Sigma_{g \in A(a)} x_{g,a} \leq C_a \, \forall a \in A \quad (4)$$

$$x_{g,a} \geq 0 \, \forall g \in G, a \in A \quad (5)$$

where, $v_{g,a}$ represents effectiveness score for a multimedia item a in the plurality of multimedia items A for a ridesharing group g among the one or more ridesharing groups G;

$x_{g,a}$ represents a feedback provided by a ridesharing group g for a multimedia item a. In a scenario, $x_{g,a}$ may represent a binary value, when the feedback corresponds to a binary feedback (i.e., positive feedback or negative feedback). For example, if the ridesharing group "dislikes" (i.e., negative feedback) the multimedia item a, $x_{g,a}=0$; and A(a) represents a set of ridesharing groups from the one or more ridesharing groups G that has provided a positive feedback for a multimedia item a.

As shown above, the maximization problem is represented in equation (2), while equations (3) to (5) represent a set of constraints for the maximization problem. Equation (3) represents a constraint that at least one target multimedia item is selected from the plurality of multimedia items. Equation (4) represents a constraint that ensures the selected plurality of targeted multimedia items meet the budget constraint $C_a$. Equation (5) represents a constraint that ensures that the at least one feedback is provided by a ridesharing group for each displayed multimedia item in the plurality of multimedia items.

A person having ordinary skill in the art will understand that the abovementioned exemplary scenario is for illustrative purpose and should not be construed to limit the scope of the disclosure.

At step 318, the selected plurality of targeted multimedia items is transmitted in a prioritized order to the vehicle-computing device 114. In an embodiment, the processor 202, in conjunction with the transceiver 206, may be configured to transmit the selected plurality of targeted multimedia items in the prioritized order to the vehicle-computing device 114. In an embodiment, the transmitted plurality of targeted multimedia items may be displayed to the plurality of users 104 traveling in the vehicle 112.

In an embodiment, before transmission of the plurality of targeted multimedia items in the prioritized order, the processor 202 may be configured to determine a current status (i.e., in progress or terminated) of the trip of the plurality of users 104 in the vehicle 112. For determining the current status, the processor 202 may compare a current time instant (i.e., $T_{CURRENT}$) with the estimated time of arrival (i.e., $T_{TOTAL}$) of the vehicle 112 at the second location. In a scenario, the processor 202 determines the current status as "in progress" when the current time instant (i.e., $T_{CURRENT}$)

is less than the estimated time of arrival (i.e., $T_{TOTAL}$) of the vehicle 112, else the current status is determined as "terminated."

In an embodiment, when the current status of the trip of the plurality of users 104 is determined to be "terminated," the processor 202, in conjunction with the transceiver 206, may be configured to store the selected plurality of targeted multimedia items and the effectiveness score of each of the selected plurality of targeted multimedia items in the group profile of the plurality of users 104 in the database server 110.

In another embodiment, when the current status of the trip of the plurality of users 104 is determined to be "in progress," the processor 202, in conjunction with the transceiver 206, may be configured to transmit the selected plurality of targeted multimedia items in the prioritized order to the vehicle-computing device 114.

In an embodiment, the prioritization of the plurality of targeted multimedia items is based on the effectiveness score of each of the plurality of targeted multimedia items and/or the temporal reputation score associated with each of the plurality of targeted multimedia items. In an embodiment, the temporal reputation score of a targeted multimedia item may be indicative of a temporal importance of the multimedia item. For example, a targeted multimedia item with a high temporal reputation score may be transmitted prior to another targeted multimedia item with a low temporal reputation score.

In an embodiment, the temporal reputation score of a targeted multimedia item may be determined based on one or more predetermined factors, such as popularity, associated with the targeted multimedia item. The one or more predetermined factors may be determined by analyzing social media profiles of the plurality of users 104. For example, if the plurality of users 104 has liked or shared a product "A" associated with a first targeted multimedia item more frequently as compared to another product "B" associated with the a second targeted multimedia item, the processor 202 may determine the first targeted multimedia item to be more popular as compared to the second targeted multimedia item. Thus, the processor 202 may determine a higher temporal reputation score for the first targeted multimedia item than the second targeted multimedia item.

A person having ordinary skill in the art will understand that the abovementioned example is for illustrative purpose and should not be construed to limit the scope of the disclosure.

In an embodiment, the plurality of users 104 may provide the at least one feedback for each of the displayed plurality of targeted multimedia items. Further, the feedback controller 210, in conjunction with the processor 202, may be configured to update the feedback history of the plurality of users 104 and the effectiveness score of each of the plurality of targeted multimedia items, based on the at least one feedback for each of the displayed plurality of targeted multimedia items.

At step 320, the selection of the plurality of targeted multimedia items is updated based on the at least one feedback for each of the plurality of targeted multimedia items and the feedback history of the plurality of users 104. In an embodiment, the processor 202, in conjunction with the feedback controller 210, may be configured to update the selection of the plurality of targeted multimedia items based on the at least one feedback for each of the plurality of targeted multimedia items and the updated feedback history of the plurality of users 104. In other words, the processor 202 may be configured to update a current policy (i.e., the selection of the plurality of targeted multimedia items) based on the context (i.e., the plurality of features) and reward (i.e., the at least one feedback) pairs.

In an embodiment, the update of the selection of the plurality of targeted multimedia items may correspond to an update of the priority order based on the updated effectiveness score. In another embodiment, the update of the selection of the plurality of targeted multimedia items may correspond to a selection of a new plurality of targeted multimedia items from the plurality of multimedia items based on the updated effectiveness score.

At step 322, a check is performed to determine the current status of the trip of the plurality of the users 104 in the vehicle 112 (i.e., $T_{CURRENT} > T_{TOTAL}$). In an embodiment, the processor 202 may be configured to perform the check to determine the current status (i.e., "in progress" or "terminated") of the trip of the plurality of the users 104 in the vehicle 112. In an embodiment, the processor 202 may compare the current time instant (i.e., $T_{CURRENT}$) with the estimated time of arrival (i.e., $T_{TOTAL}$) of the vehicle 112 at the second location. In a scenario, when the processor 202 determines that the current status is "in progress" (i.e., $T_{CURRENT} > T_{TOTAL}$), the control passes to step 318. Else, the processor 202, in conjunction with the transceiver 206, may be configured to store the updated selection of the plurality of targeted multimedia items and the corresponding effectiveness scores in the group profile of the plurality of users 104 and the control passes to end step 324.

Figure 4:
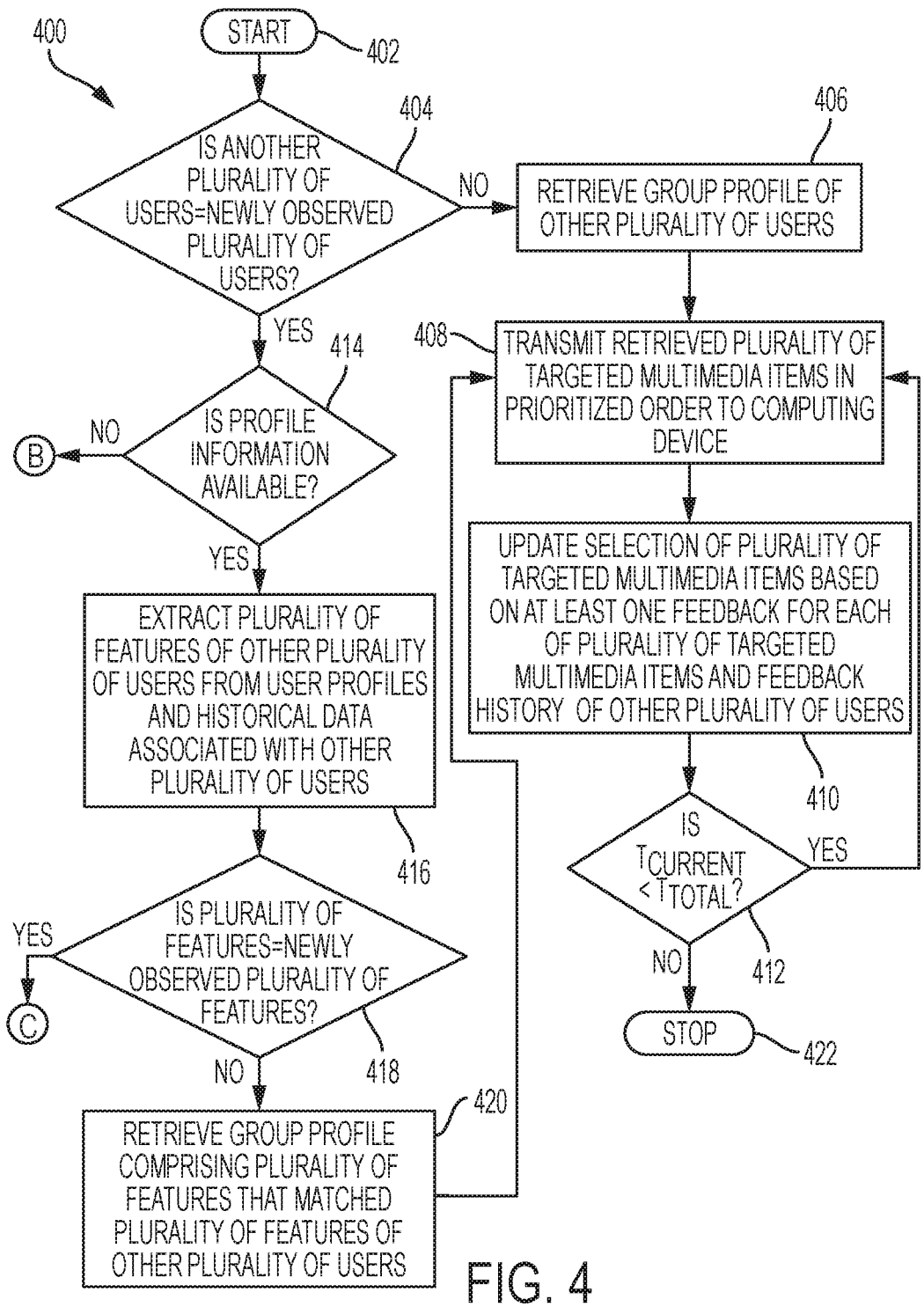
FIG. 4 is a flowchart that illustrates a method for displaying targeted multimedia items to a ridesharing group, in accordance with at least one embodiment.

FIG. 4 is a flowchart that illustrates a method for displaying targeted multimedia items to a ridesharing group in accordance with at least one embodiment. FIG. 4 is described in conjunction with FIG. 1, FIG. 2, and FIGS. 3A and 3B. With reference to FIG. 4, there is shown a flowchart 400 that illustrates a method for displaying targeted multimedia items to a ridesharing group. The method starts at step 402 and proceeds to step 404.

At step 404, a check is performed to determine whether another plurality of users (i.e., the ridesharing group), traveling in the vehicle 112, corresponds to a newly observed plurality of users or a previously observed plurality of users. In an embodiment, the processor 202 may be configured to perform the check to determine whether the other plurality of users, traveling in the vehicle 112, corresponds to the newly observed plurality of users or the previously observed plurality of users. In an embodiment, the processor 202 may be configured to perform the check after the request to display targeted multimedia items is received from the ridesharing server 106. The processor 202 may determine whether a group profile of the other plurality of users is stored in the database server 110. In an embodiment, the processor 202 may utilize the user identification details in the request received from the ridesharing server 106 to determine whether a group profile associated with the other plurality of users is stored in the database server 110. In a scenario, the processor 202 may determine that the group profile associated with the other plurality of users is stored in the database server 110. For example, if the other plurality of users corresponds to the plurality of users 104, the processor 202 may be configured to identify the group profile of the plurality of users 104 that was previously stored in the database server 110. In such a case, the other plurality of users may correspond to the previously observed plurality of users. In an alternate scenario, the processor 202 may determine that the group profile associated with the other plurality of users is not stored in the database server 110. In such a case, the other plurality of users may correspond to the newly observed plurality of users. Thereafter, when the processor 202 determines that the other plurality of users, traveling in the vehicle 112, corresponds to the previously observed plurality of users, the control passes to step 406. Else, the control passes to step 414.

At step 406, the group profile of the other plurality of users is retrieved from the database server 110. In an embodiment, the processor 202 may be configured to retrieve the group profile associated with the other plurality of users from the database server 110. Thereafter, the processor 202 may retrieve the selected plurality of targeted multimedia items or the updated plurality of targeted multimedia items from the group profile of the other plurality of users.

At step 408, the retrieved plurality of targeted multimedia items is transmitted in a prioritized order to the vehicle-computing device 114. In an embodiment, the processor 202, in conjunction with the transceiver 206, may be configured to transmit the retrieved plurality of targeted multimedia items in the prioritized order to the vehicle-computing device 114. In an embodiment, the transmitted plurality of targeted multimedia items may be displayed to the other plurality of users traveling in the vehicle 112. In an embodiment, the other plurality of users may provide the at least one feedback for each of the displayed plurality of targeted multimedia items. Further, the feedback controller 210, in conjunction with the processor 202, may be configured to update the feedback history of the other plurality of users and the effectiveness score of each of the plurality of targeted multimedia items, based on the at least one feedback for each of the displayed plurality of targeted multimedia items.

At step 410, the selection of the plurality of targeted multimedia items is updated based on the at least one feedback for each of the displayed plurality of targeted multimedia items and the feedback history of the other plurality of users. In an embodiment, the processor 202, in conjunction with the feedback controller 210, may be configured to update the selection of the plurality of targeted multimedia items based on the at least one feedback for each of the plurality of targeted multimedia items and the updated feedback history of the other plurality of users. The method to update the selection of the plurality of targeted multimedia items has been described earlier in step 320 of FIGS. 3A and 3B.

At step 412, a check is performed to determine the current status of the trip of the other plurality of users in the vehicle 112 (i.e., $T_{CURRENT} > T_{TOTAL}$). In an embodiment, the processor 202 may be configured to perform the check to determine the current status (i.e., "in progress" or "terminated") of the trip of the other plurality of users in the vehicle 112. In an embodiment, the processor 202 may compare the current time instant (i.e., $T_{CURRENT}$) with the estimated time of arrival (i.e., $T_{TOTAL}$) of the vehicle 112 at the second location. In a scenario, when the processor 202 determines that the current status is "in progress" (i.e., $T_{CURRENT} > T_{TOTAL}$), the control passes to step 408. Else, the processor 202, in conjunction with the transceiver 206, may be configured to update the group profile of the other plurality of users by storing the updated selection of the plurality of targeted multimedia items and the corresponding effectiveness scores in the group profile of the other plurality of users and the control passes to end step 422.

At step 414, a check is performed to determine whether the profile information associated with the other plurality of users is available. In an embodiment, the processor 202 may be configured to perform the check to determine whether the profile information associated with the other plurality of users is available. In an embodiment, the processor 202 may be configured to perform the check based on the user identification details in the request received from the ride-sharing server 106. In a scenario, when the processor 202 determines that the profile information associated with the other plurality of users is available, the control passes to step 416. Else, the control passes to step 308 in the flowchart 300 (FIGS. 3A and 3B). Further, after the execution of the end step 324 in the flowchart 300 (FIGS. 3A and 3B), the control passes to end step 422 in the flowchart 400 (FIG. 4).

At step 416, the plurality of features of the other plurality of users is extracted from the user profiles and the historical data associated with the other plurality of users. In an embodiment, the aggregator 208, in conjunction with the processor 202, may be configured to extract the plurality of features of the other plurality of users from the user profiles and the historical data associated with the other plurality of users. The method of extraction of the plurality of features has been described earlier in step 306 of the flowchart 300 (FIGS. 3A and 3B).

At step 418, a check is performed to determine whether the plurality of features of the other plurality of users corresponds to a newly observed plurality of features or a previously observed plurality of features. In an embodiment, the processor 202 may be configured to perform the check to determine whether the plurality of features of the other plurality of users corresponds to a newly observed plurality of features or the previously observed plurality of features. In other words, the processor 202 may be configured to identify whether the context (i.e., the plurality of features) of the other plurality of users is similar to any previously observed context (i.e., previously observed plurality of features).

The processor 202 may be configured to compare the plurality of features of the other plurality of users with the plurality of features in one or more group profiles previously stored in the database server 110. In a scenario, when the plurality of features of the other plurality of users matches with at least a plurality of features in a group profile among the one or more group profiles previously stored in the database server 110, the plurality of features of the other plurality of users corresponds to the previously observed plurality of features. For example, based on the comparison, the processor 202 may determine that the plurality of features of the other plurality of users matches the plurality of features in the group profile of the plurality of users 104. In an alternate scenario, when the plurality of features of the other plurality of users does not match with any of the plurality of features in the one or more group profiles previously stored in the database server 110, the plurality of features of the other plurality of users corresponds to the newly observed plurality of features.

In an embodiment, when the plurality of features of the other plurality of users corresponds to the previously observed plurality of features, the control passes to step 420. Else, the control passes to step 308 in the flowchart 300 (FIGS. 3A and 3B). Further, after the execution of the end step 324 in the flowchart 300 (FIGS. 3A and 3B), the control passes to end step 422 in the flowchart 400 (FIG. 4).

At step 420, the group profile comprising the plurality of features that matched the plurality of features of the other plurality of users is retrieved from the database server 110. In an embodiment, the processor 202, in conjunction with the transceiver 206, may be configured to retrieve the group profile comprising the plurality of features that matched the plurality of features of the other plurality of users from the database server 110. Thereafter, the processor 202 may be configured to retrieve the plurality of targeted multimedia items from the retrieved group profile. In other words, the processor 202 may be configured to retrieve the actions (i.e., the plurality of targeted multimedia items) that are already mapped to a similar context (i.e., the plurality of features that matched the plurality of features of the other plurality of users).

In an embodiment, the processor 202 may further create a group profile associated with the other plurality of users. The processor 202 may store the created group profile in the database server 110, over the communication network 116. Thereafter, the control passes to step 408.

A person having ordinary skill in the art will understand that the abovementioned examples are for illustrative purpose and should not be construed to limit the scope of the disclosure.

Figure 5A:
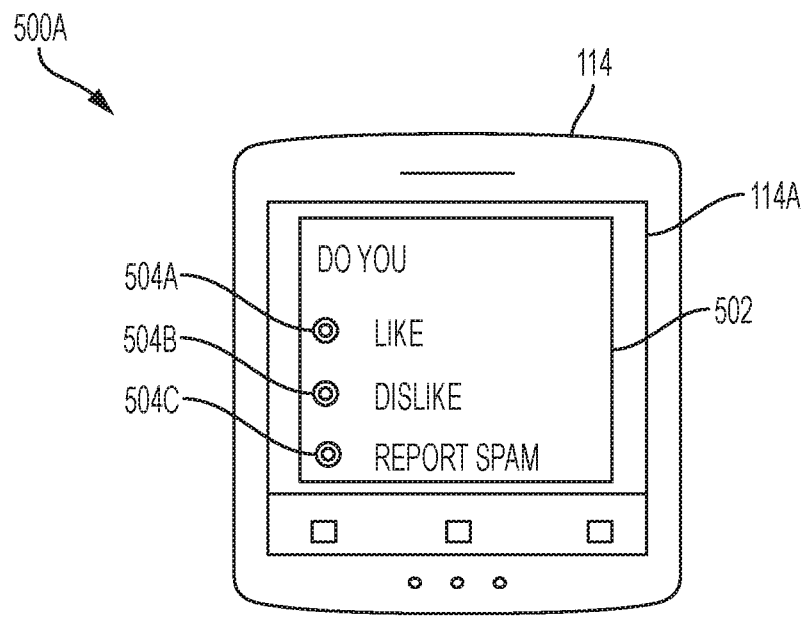
FIG. 5A is a block diagram that illustrates an exemplary scenario for presenting a first user-interface to a ridesharing group on a vehicle-computing device for providing feedback, in accordance with at least one embodiment.

FIG. 5A is a block diagram that illustrates exemplary scenario for presenting a first user-interface to a ridesharing group on a vehicle-computing device for providing feedback, in accordance with at least one embodiment. FIG. 5A is described in conjunction with FIGS. 1-4.

With reference to FIG. 5A, there is shown an exemplary scenario 500A for presenting a first user-interface 502 to the plurality of users 104 on a display screen 114A of the vehicle-computing device 114 for providing the at least one feedback. In an embodiment, after displaying a multimedia item among the plurality of multimedia items or the plurality of targeted multimedia items, the application server 108 may present the first user-interface 502 to the plurality of users 104 on the display screen 114A of the vehicle-computing device 114. The first user-interface 502 may comprise a plurality of radio buttons comprising a first radio button 504A, a second radio button 504B, and a third radio button 504C. Further, each radio button, such as the first radio button 504A, the second radio button 504B, and the third radio button 504C, is associated with a tag, such as "LIKE," "DISLIKE" and "REPORT AS SPAM," respectively. The plurality of users 104 may select one radio button, such as the first radio button 504A, the second radio button 504B, or the third radio button 504C, by clicking on the display screen 114A. The selection of the one radio button may correspond to the at least one feedback, associated with the displayed multimedia item, provided by the plurality of users 104.

Figure 5B:
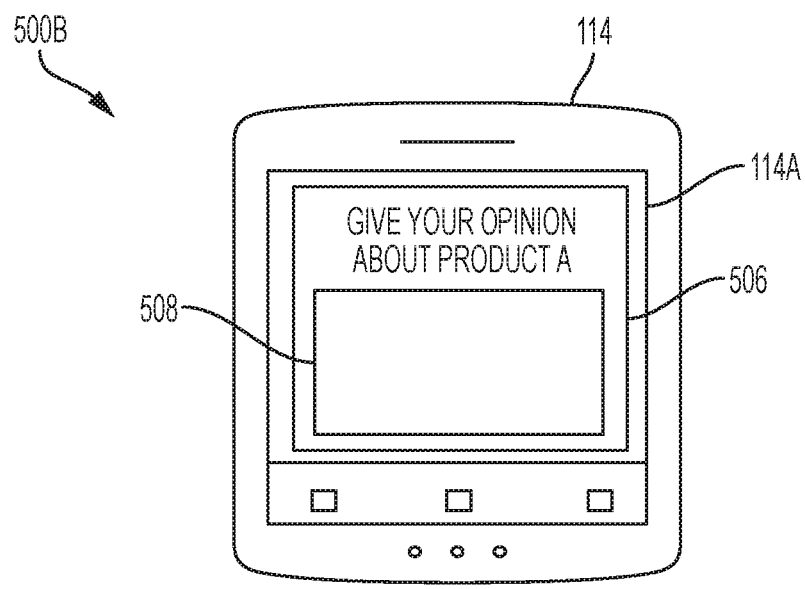
FIG. 5B is a block diagram that illustrates an exemplary scenario for presenting a second user-interface to a ridesharing group on a vehicle-computing device for providing feedback, in accordance with at least one embodiment.

FIG. 5B is a block diagram that illustrates exemplary scenario for presenting a second user-interface to a ridesharing group on a vehicle-computing device for providing feedback, in accordance with at least one embodiment. FIG. 5B is described in conjunction with FIGS. 1-4.

With reference to FIG. 5B, there is shown an exemplary scenario 500B for presenting a second user-interface 508 to the plurality of users 104 on the display screen 114A of the vehicle-computing device 114 for providing the at least one feedback. In an embodiment, after displaying a multimedia item among the plurality of multimedia items or the plurality of targeted multimedia items, the application server 108 may present the second user-interface 508 to the plurality of users 104 on the display screen 114A of the vehicle-computing device 114. The second user-interface 508 may comprise an input section 510. The plurality of users 104 may post a review (i.e., the combined assessment) for the displayed multimedia item in the input section 510. The posted review may correspond to the at least one feedback, associated with the displayed multimedia item, provided by the plurality of users 104.

Figure 5C:
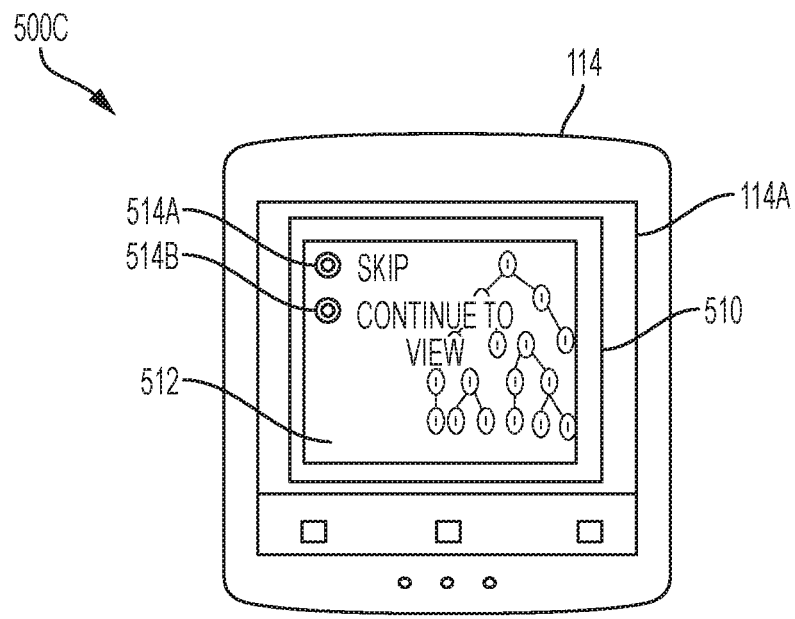
FIG. 5C is a block diagram that illustrates an exemplary scenario for presenting a third user-interface to a ridesharing group on a vehicle-computing device for providing feedback, in accordance with at least one embodiment.

FIG. 5C is a block diagram that illustrates exemplary scenario for presenting a third user-interface to a ridesharing group on a vehicle-computing device for providing feedback, in accordance with at least one embodiment. FIG. 5C is described in conjunction with FIGS. 1-4.

With reference to FIG. 5C, there is shown an exemplary scenario 500C for presenting a third user-interface 512 to the plurality of users 104 on the display screen 114A of the vehicle-computing device 114 for providing the at least one feedback. In an embodiment, at the beginning of the display of a multimedia item among the plurality of multimedia items or the plurality of targeted multimedia items, the application server 108 may present the third user-interface 512 to the plurality of users 104 on the display screen 114A of the vehicle-computing device 114. The third user-interface 512 may comprise two radio buttons, such as radio button 514A and a radio button 514B. Further, each radio button, such as the radio button 514A and the radio button 514B, is associated with a tag, such as "SKIP" and "CONTINUE TO VIEW," respectively. The plurality of users 104 may select one radio button, such as the radio button 514A or the radio button 514B, by clicking on the display screen 114A. The selection of the one radio button may correspond to the at least one feedback, associated with the displayed multimedia item, provided by the plurality of users 104. In an embodiment, if the plurality of users 104 selects the radio button 514A "SKIP," the application server 108 may skip the multimedia item that is currently being displayed to the plurality of users 104 and the next multimedia item is displayed. However, if the plurality of users 104 selects the radio button 514B "CONTINUE TO VIEW," the current multimedia item is not skipped.

Figure 5D:
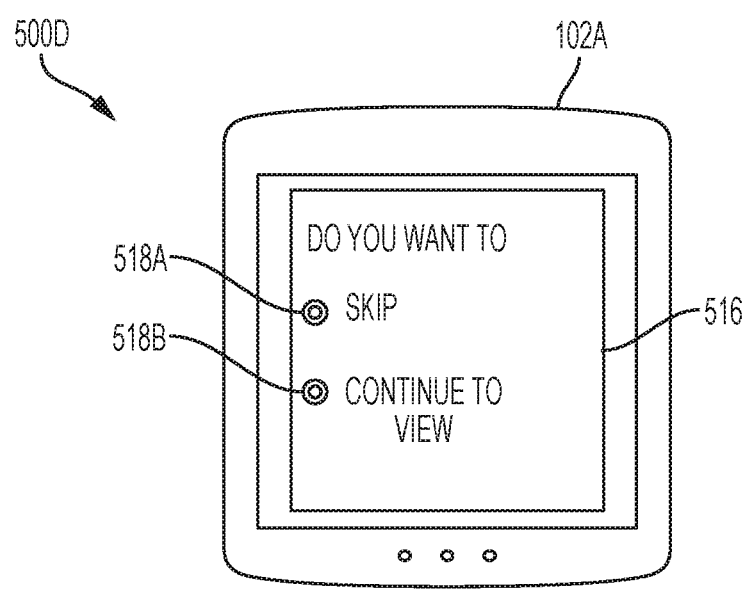
FIG. 5D is a block diagram that illustrates an exemplary scenario for presenting a fourth user-interface to each user among a ridesharing group on a corresponding user-computing device for providing feedback, in accordance with at least one embodiment.

FIG. 5D is a block diagram that illustrates exemplary scenario for presenting a fourth user-interface to each user among a ridesharing group on a corresponding user-computing device for providing feedback, in accordance with at least one embodiment. FIG. 5D is described in conjunction with FIGS. 1-4.

With reference to FIG. 5D, there is shown an exemplary scenario 500D for presenting a fourth user-interface 516 to each user, such as the first user 104A, the second user 104B, and the third user 104C, among the plurality of users 104 on the display screen of the corresponding user-computing device, such as the first user-computing device 102A, the second user-computing device 102B, and the third user-computing device 102C, for providing the at least one feedback. In an embodiment, at the beginning of the display of a multimedia item among the plurality of multimedia items or the plurality of targeted multimedia items, the application server 108 may present the fourth user-interface 516 to each user among the plurality of users 104 on the display screen of the corresponding user-computing device, such as the first user-computing device 102A, the second user-computing device 102B, and the third user-computing device 102C. The fourth user-interface 516 may comprise two radio buttons, such as a radio button 518A and a radio button 518B. Further, each radio button, such as the radio button 518A and the radio button 518B, is associated with a tag, such as "SKIP" and "CONTINUE TO VIEW," respectively. Each user among the plurality of users 104 may select one radio button, such as the radio button 518A or the radio button 518B, by clicking on the display screen of the corresponding user-computing device. The application server 108 may further process the individual selection of each user among the plurality of users 104 to determine the at least one feedback, associated with the displayed multimedia item. In an embodiment, if two out of three users among the plurality of users 104 select the option "SKIP,"

the currently displayed multimedia item may be skipped and the next multimedia item may be displayed on the vehicle-computing device 114.

A person having ordinary skill in the art will understand that the abovementioned exemplary scenarios are for illustrative purpose and should not be construed to limit the scope of the disclosure.

Figure 6A:
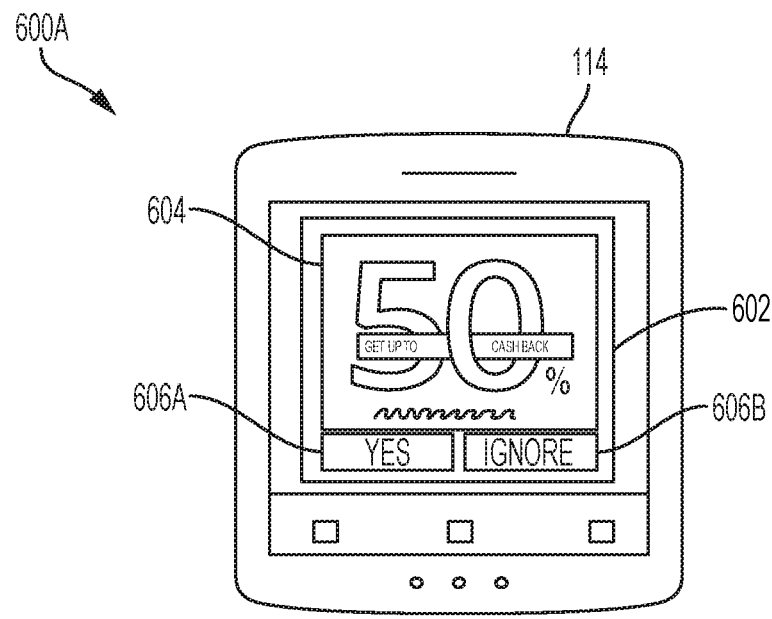
FIG. 6A is a block diagram that illustrates an exemplary scenario for presenting a fifth user-interface on a vehicle-computing device for displaying a unique product and/or service code to a ridesharing group, in accordance with at least one embodiment.

FIG. 6A is a block diagram that illustrates an exemplary scenario for presenting a fifth user-interface on a vehicle-computing device for displaying a unique product and/or service code to a ridesharing group, in accordance with at least one embodiment. FIG. 6A is described in conjunction with FIGS. 1-4.

With reference to FIG. 6A, there is shown an exemplary scenario 600A for presenting a fifth user-interface 602 on the vehicle-computing device 114 for displaying a unique product and/or service code to the plurality of users 104. The application server 108 may present the fifth user-interface 602 after displaying a multimedia item among the plurality of multimedia items or the plurality of targeted multimedia items. The fifth user-interface 602 displays the unique product and/or service code, such as a discount coupon 604, to the plurality of users 104. Further, the discount coupon 604 corresponds to a group coupon, thus it can be used by all users among the plurality of users 104. The fifth user-interface 602 further comprises a "YES" tab 606A and an "IGNORE" tab 606B. The plurality of users 104 may select any of the two tabs (i.e., the "YES" tab 606A or the "IGNORE" tab 606B) by clicking on it, for providing the at least one feedback. In this scenario, the selection by the plurality of users 104 may be associated with the utilization of the unique product and/or service code (i.e., the discount coupon 604). In such a scenario, the plurality of users 104 may have to select any of the two tabs (i.e., the "YES" tab 606A and the "IGNORE" tab 606B) within the pre-determined time interval, such as "5 seconds," associated with the displayed multimedia item.

Figure 6B:
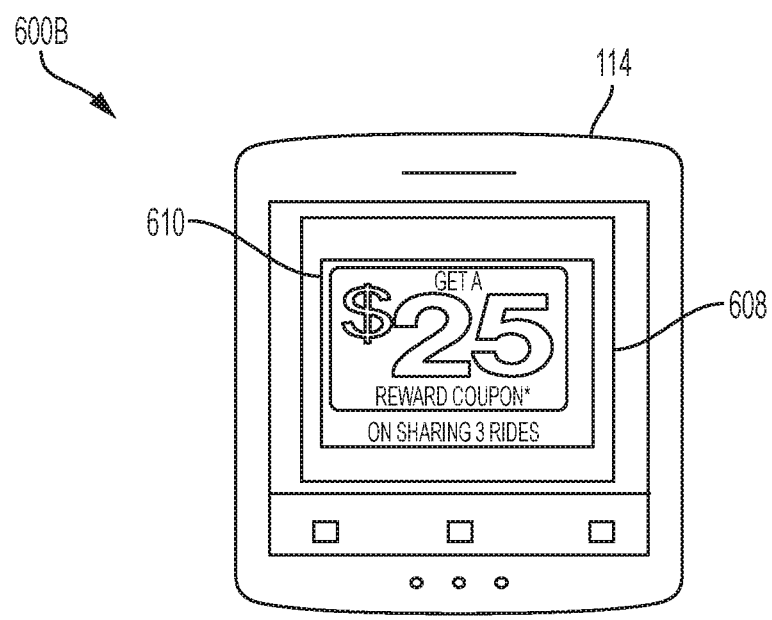
FIG. 6B is a block diagram that illustrates an exemplary scenario for presenting a sixth user-interface on a vehicle-computing device for displaying a unique product and/or service code to a ridesharing group, in accordance with at least one embodiment.

FIG. 6B is a block diagram that illustrates an exemplary scenario for presenting a sixth user-interface on a vehicle-computing device for displaying a unique product and/or service code to a ridesharing group, in accordance with at least one embodiment. FIG. 6B is described in conjunction with FIGS. 1-4.

With reference to FIG. 6B, there is shown an exemplary scenario 600B for presenting a sixth user-interface 608 on the vehicle-computing device 114 for displaying a unique product and/or service code to the plurality of users 104. The application server 108 may present the sixth user-interface 608 after displaying a multimedia item among the plurality of multimedia items or the plurality of targeted multimedia items. The sixth user-interface 608 displays the unique product and/or service code, such as a reward coupon 610, to plurality of users 104. Further, the reward coupon 610 corresponds to a group coupon, thus it can be used by one or more users among the plurality of users 104 within or beyond the pre-determined time interval. Further, the application server 108 may receive a notification when the reward coupon 610 is utilized by any user among the plurality of users 104. In this scenario, the utilization of the reward coupon 610 by any user among the plurality of users 104 may correspond to the at least one feedback associated with the displayed multimedia item.

A person having ordinary skill in the art will understand that the above mentioned exemplary scenarios are for illustrative purpose and should not be construed to limit the scope of the disclosure.

The disclosed embodiments encompass numerous advantages. The disclosure provides a method and a system for displaying targeted multimedia items to a ridesharing group. The disclosed method and system display targeted multimedia items to the ridesharing group (i.e., a plurality of users) by learning their aggregated preferences and/or feedbacks (i.e., both synchronous and asynchronous feedbacks). Further, the display of the targeted multimedia items is prioritized for maximizing total reward (i.e., positive feedback) and/or revenue for a rideshare operator associated with the ridesharing server 106. The disclosed method and system captures a combined decision (i.e., the feedback) of the ridesharing group for displaying the targeted multimedia items rather than individual decision. Once all plurality of features are learnt, the disclosed method and system automatically utilize the learning to display targeted multimedia items to newly observed ridesharing groups, and further customize the display in real-time based on the feedback received from the newly observed ridesharing groups. The disclosed method and system can be utilized any service provider dealing in on-demand transport services for monetization on displaying targeted multimedia items.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for displaying targeted multimedia items to a ridesharing group have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of displaying targeted multimedia items to a ridesharing group, the method comprising:

transmitting, by one or more transceivers in a first computing device, a plurality of multimedia items to a second computing device installed in a vehicle, wherein at least a transmitted multimedia item of the plurality of multimedia items is associated with a unique product and/or service code, wherein the plurality of multimedia items are displayed by the second computing device to a plurality of users traveling in the vehicle;

receiving, by the one or more transceivers in the first computing device, at least one feedback provided by the plurality of users on each of the transmitted plurality of multimedia items, wherein the at least one feedback corresponds to a utilization of the unique product and/or service code, and a combined assessment provided by the plurality of users in real-time for each of the plurality of multimedia items;

determining, by one or more processors in the first computing device, an effectiveness score for each of the transmitted plurality of multimedia items based on the corresponding at least one feedback provided by the plurality of users;

selecting, by the one or more processors in the first computing device, a plurality of targeted multimedia items from the plurality of multimedia items in real-time based on the determined effectiveness score and a pre-specified constraint; and transmitting, by the one or more transceivers in the first computing device, the selected plurality of targeted multimedia items in a prioritized order to the second computing device, wherein the transmitted plurality of targeted multimedia items is displayed by the second computing device to the plurality of users traveling in the vehicle.

2. The method of claim 1, further comprising extracting, by the one or more processors in the first computing device, a plurality of features of the plurality of users from corresponding user profiles and historical data associated with the plurality of users.

3. The method of claim 2, wherein the plurality of features comprises information pertaining to one or more preferences and demographic details of the plurality of users.

4. The method of claim 2, further comprising selecting, by the one or more processors in the first computing device, the plurality of multimedia items from another plurality of multimedia items based on the plurality of features associated with the plurality of users and/or a feedback history of the plurality of users, wherein the feedback history comprises previous feedback, on previously displayed multimedia items, provided by the plurality of users.

5. The method of claim 4, further comprising updating, by the one or more processors in the first computing device, the feedback history based on the at least one feedback on each of the transmitted plurality of multimedia items provided by the plurality of users.

6. The method of claim 1, wherein the plurality of multimedia items are associated with a plurality of products and/or services.

7. The method of claim 1, wherein the prioritization of the plurality of targeted multimedia items is based on the effectiveness score of each of the plurality of targeted multimedia items and/or a temporal reputation score associated with each of the plurality of targeted multimedia items.

8. The method of claim 1, wherein the selected plurality of targeted multimedia items is transmitted in the prioritized order to maximize benefits associated with the plurality of targeted multimedia items.

9. The method of claim 1, wherein the selection of the plurality of targeted multimedia items is based on one or more explore-exploit techniques and/or one or more similarity measuring techniques.

10. The method of claim 1, further comprising updating, by the one or more processors in the first computing device, the selection of the plurality of targeted multimedia items based on the at least one feedback for each of the plurality of targeted multimedia items and a feedback history of the plurality of users.

11. A system of displaying targeted multimedia items to a ridesharing group, the system comprises:
one or more processors in a first computing device configured to:
transmit a plurality of multimedia items, by utilizing one or more transceivers in the first computing device, to a second computing device installed in a vehicle, wherein at least a transmitted multimedia item of the plurality of multimedia items is associated with a unique product and/or service code, wherein the plurality of multimedia items are displayed by the second computing device to a plurality of users traveling in the vehicle;
receive at least one feedback, by utilizing the one or more transceivers in the first computing device, provided by the plurality of users for each of the transmitted plurality of multimedia items, wherein the at least one feedback corresponds to a utilization of the unique product and/or service code, and a combined assessment provided by the plurality of users in real-time for each of the plurality of multimedia items;
determine an effectiveness score for each of the transmitted plurality of multimedia items based on the corresponding at least one feedback provided by the plurality of users;
select a plurality of targeted multimedia items from the plurality of multimedia items in real-time based on the determined effectiveness score and a pre-specified constraint; and
transmit the selected plurality of targeted multimedia items in a prioritized order, by utilizing the one or more transceivers in the first computing device, to the second computing device, wherein the transmitted plurality of targeted multimedia items is displayed by the second computing device to the plurality of users traveling in the vehicle.

12. The system of claim 11, wherein the one or more processors in the first computing device are further configured to extract a plurality of features of the plurality of users from corresponding user profiles and historical data associated with the plurality of users.

13. The system of claim 12, wherein the plurality of features comprises information pertaining to one or more preferences and demographic details of the plurality of users.

14. The system of claim 12, wherein the one or more processors in the first computing device are further configured to select the plurality of multimedia items from another plurality of multimedia items based on the plurality of features associated with the plurality of users and/or a feedback history of the plurality of users, wherein the feedback history comprises previous feedback, on previously displayed multimedia items, provided by the plurality of users.

15. The system of claim 14, wherein the one or more processors in the first computing device are further configured to update the feedback history based on the at least one feedback on each of the transmitted plurality of multimedia items provided by the plurality of users.

16. The system of claim 11, wherein the prioritization of the plurality of targeted multimedia items is based on the effectiveness score of each of the plurality of targeted multimedia items and/or a temporal reputation score associated with each of the plurality of targeted multimedia items.

17. The system of claim 11, wherein the selected plurality of targeted multimedia items is transmitted in the prioritized order to maximize benefits associated with the plurality of targeted multimedia items.

18. The system of claim 11, wherein the selection of the plurality of targeted multimedia items is based on one or more explore-exploit techniques and/or one or more similarity measuring techniques.

19. The system of claim 11, wherein the one or more processors in the first computing device are further configured to update the selection of the plurality of targeted multimedia items based on the at least one feedback for each of the plurality of targeted multimedia items and a feedback history of the plurality of users.

20. A computer program product for use with a computer, the computer program product comprising a non-transitory computer readable medium, wherein the non-transitory computer readable medium stores a computer program code of data processing for displaying targeted multimedia items to a ridesharing group, wherein the computer program code is executable by one or more processors in a first computing device to:
transmit a plurality of multimedia items, by utilizing one or more transceivers in the first computing device, to a second computing device installed in a vehicle, wherein at least a transmitted multimedia item of the plurality of multimedia items is associated with a unique product and/or service code, wherein the plurality of multimedia items are displayed by the second computing device to a plurality of users traveling in the vehicle;
receive at least one feedback, by utilizing the one or more transceivers in the first computing device, provided by the plurality of users for each of the transmitted plurality of multimedia items, wherein the at least one feedback corresponds to a utilization of the unique product and/or service code, and a combined assessment provided by the plurality of users in real-time for each of the plurality of multimedia items;
determine an effectiveness score for each of the transmitted plurality of multimedia items based on the corresponding at least one feedback provided by the plurality of users;
select a plurality of targeted multimedia items from the plurality of multimedia items in real-time based on the determined effectiveness score and a pre-specified constraint; and
transmit the selected plurality of targeted multimedia items in a prioritized order, by utilizing the one or more transceivers in the first computing device, to the second computing device, wherein the transmitted plurality of targeted multimedia items is displayed by the second computing device to the plurality of users traveling in the vehicle.

* * * * *